US010275358B2

(12) United States Patent
Lin

(10) Patent No.: US 10,275,358 B2
(45) Date of Patent: Apr. 30, 2019

(54) HIGH-PERFORMANCE INSTRUCTION CACHE SYSTEM AND METHOD

(71) Applicant: SHANGHAI XIN HAO MICRO ELECTRONICS CO. LTD., Shanghai (CN)

(72) Inventor: Kenneth Chenghao Lin, Shanghai (CN)

(73) Assignee: SHANGHAI XIN HAO MICRO ELECTRONICS CO. LTD., Shanghai (CN)

( * ) Notice: Subject to any disclaimer, the term of this patent is extended or adjusted under 35 U.S.C. 154(b) by 16 days.

(21) Appl. No.: 15/722,814

(22) Filed: Oct. 2, 2017

(65) Prior Publication Data

US 2018/0165212 A1    Jun. 14, 2018

Related U.S. Application Data

(63) Continuation of application No. 14/913,837, filed as application No. PCT/CN2014/085063 on Aug. 22, (Continued)

(30) Foreign Application Priority Data

Feb. 8, 2013    (CN) .......................... 2013 1 0050837
Aug. 23, 2013    (CN) .......................... 2013 1 0379657

(51) Int. Cl.
*G06F 12/00*    (2006.01)
*G06F 12/0875*    (2016.01)
(Continued)

(52) U.S. Cl.
CPC ...... *G06F 12/0875* (2013.01); *G06F 12/0864* (2013.01); *G06F 12/0897* (2013.01); *G06F 2212/452* (2013.01)

(58) Field of Classification Search
None
See application file for complete search history.

(56) References Cited

U.S. PATENT DOCUMENTS 5,897,655 A    4/1999    Mallick
7,509,332 B1    3/2009    Milby
(Continued)

FOREIGN PATENT DOCUMENTS

CN    101350030 A    1/2009
CN    101968795 A    2/2011
(Continued)

OTHER PUBLICATIONS

The World Intellectual Property Organization (WIPO) International Search Report for PCT/CN2014/071812 dated Oct. 6, 2014, 9 pages.

*Primary Examiner* — Midys Rojas
(74) *Attorney, Agent, or Firm* — Anova Law Group, PLLC

(57) ABSTRACT

A high-performance instruction cache method based on extracting instruction information and store in a track table. The method enables reading of all levels of cache, including the last level cache, without performing tag matching. The method enables the content of the track table addressing directly instruction memories in both track cache or in set associative organization. Further, the method includes a memory replacement method using a track table, a first memory containing multiple rows instruction blocks, and a correlation table. The correlation table records source addresses of rows indexing a target row and the lower level memory address of the target row. During replacement of a first memory row, the lower level memory address of the target row replaces the address of the target row in the source row of the track table, and therefore preserve the indexing
(Continued)

relationship recorded in the track table despite the replacement.

14 Claims, 8 Drawing Sheets

Related U.S. Application Data 2014, now abandoned, application No. 15/722,814, which is a continuation of application No. 14/766,754, filed as application No. PCT/CN2014/071812 on Jan. 29, 2014, now abandoned.

(51) Int. Cl.
*G06F 12/0864* (2016.01)
*G06F 12/0897* (2016.01)

(56) References Cited

U.S. PATENT DOCUMENTS

| | | |
|---|---|---|
| 8,732,403 B1 | 5/2014 | Nayak |
| 2010/0030997 A1 | 2/2010 | Gupta |
| 2011/0087866 A1 | 4/2011 | Shah et al. |
| 2011/0238917 A1 | 9/2011 | Lin et al. |
| 2012/0173821 A1 | 7/2012 | Levenstein et al. |

FOREIGN PATENT DOCUMENTS

| | | |
|---|---|---|
| CN | 102110058 A | 6/2011 |
| CN | 102841865 A | 12/2012 |
| EP | 2523099 A2 | 11/2012 |
| JP | 2571342 B2 | 1/1997 |

HIGH-PERFORMANCE INSTRUCTION CACHE SYSTEM AND METHOD

CROSS-REFERENCES TO RELATED APPLICATIONS

This application claims priority of U.S. patent application Ser. No. 14/913,837, filed on Feb. 23, 2016, which is a national phase entry under 35 U.S.C. § 371 of International Application No. PCT/CN2014/085063, filed on Aug. 22, 2014, which claims priority of Chinese Patent Application No. 201310379657.9, filed on Aug. 23, 2013; and of U.S. patent application Ser. No. 14/766,754, filed on Aug. 9, 2015, which is a national phase entry under 35 U.S.C. § 371 of International Application No. PCT/CN2014/071812, filed on Jan. 29, 2014, which claims priority of Chinese Patent Application No. 201310050837.2, filed on Feb. 8, 2013, the entire contents of all of which are incorporated by reference herein.

FIELD OF THE INVENTION

The present invention generally relates to the fields of computers, communication and integrated circuit.

BACKGROUND

In general, a cache is used to duplicate a certain part of a lower level memory, so that the duplicated part in the cache can be accessed by a higher level memory or a processor core in a short amount of time and thus to ensure continued pipeline processing of the processor core.

Currently, cache addressing is based on the following ways. First, an index part of an address is used to read out a tag from a tag memory. At the same time, the index and an offset part of the address are used to perform an addressing operation to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For a multi-way set associative cache, the above operations are performed in parallel on each set to detect which way has a cache hit. Contents read out from the set with the cache hit are valid. If all sets experience cache misses, contents read out from any set are invalid. After a cache miss, cache control logic fills the cache with contents from the lower level storage medium.

BRIEF SUMMARY OF THE DISCLOSURE

In the current technologies, due to power and speed limitations (e.g., a multi-way set associative cache requires that contents and tags from all cache sets addressed by a same index are read out and compared at the same time), in order to achieve the better performance, a multiple level cache system is used, where the number of way sets in a lower level cache is larger than the number of way sets in a higher level cache. In addition, cache miss can be divided into three types: compulsory miss, conflict miss, and capacity miss. Under existing cache structures, except a small amount of the successfully pre-fetched contents, the compulsory miss is inevitable.

The modern cache systems are usually constituted by a multi-way set associative multi-level cache. New cache structures, such as victim cache, trace cache and prefetching, are introduced based on the above basic cache structures, improving the above structures. Therefore, with the widening gap between the speed of the processor and the speed of the memory, in the current computer architecture, various cache misses are still a serious bottleneck in increasing the performance of modern processors or computing systems.

Further, In the memory device (including but not limited to the cache), there is a process of information replacement. Because a memory device has a limited storage capacity (that is, the storage capacity is a specific limited value), when the memory device is full or the storage space to store the needed information is greater than remaining storage capacity of storage device, the storage space to store the needed information overlaps a part of information that is stored in the storage device. That is, part of information stored in the storage device needs to be deleted to release an amount of storage space to store the needed information.

The disclosed systems and methods are directed to solve one or more problems set forth above and other problems.

One aspect of the present disclosure includes a high-performance instruction cache method for facilitating operation of a processor core coupled to a second memory containing executable instructions, and a first memory with a faster speed than the second memory, the method comprising: examining instructions filled from the second memory to the first memory; extracting instruction information containing at least branch information; based on the extracted instruction information, creating a plurality of tracks in a track table, wherein a track in the track table corresponds one-to-one to an instruction block in the first memory, each track table entry corresponds to an instruction; and based on one or more tracks from a plurality of instruction tracks, filling at least one or more instruction that are possibly executed by the processor core from the second memory into the first memory; the second memory is a set associative memory; the track in the track table corresponds to an instruction block in the second memory, according to the information stored in the track table, the corresponding instruction can be read out from the first memory or from the second memory without tag-matching operation.

Optionally, every instruction block in the first memory corresponds to a first memory address; every instruction block in the second memory corresponds to a second memory address; each level two instruction block includes at least one level one instruction block; recording the relationship between the second memory address and the instruction block in an active list.

Optionally, based on the first memory address, performing an addressing operation for a target address to determine whether the target instruction belongs to an instruction block in the first memory.

Optionally, a second memory address is written into the track table by performing a matching operation; and the second memory address is changed to the first memory address when the instruction from the first memory is filled into the second memory.

Optionally, storing also the second address of the previous and succeeding second memory blocks into the active list; if the branch target instruction locates at the same second memory block with the branch instruction itself but different first memory blocks, and the first memory address in micro active list which corresponds to the first memory block is valid, then the first memory address of branch target instruction is directly derived from the first memory address read out from the micro active list; if the branch target instruction locates at the same second memory block with the branch instruction itself but different first memory blocks, and the first memory address in micro active list which corresponds to the first memory block is invalid, then the second memory address of branch target instruction is directly derived from the second memory address of this branch instruction; if the branch target instruction locates at the previous or next second memory block of the branch instruction, and the second memory address in micro active list which corresponds to the previous or next second memory block is valid, then the second memory address of the branch target instruction is direct derived from the second memory address which is read out from the micro active list.

Optionally, multiple second memory addresses and their corresponding content in active list are stored in micro active list.

Optionally, comparing the branch target address with the content of micro active list once branch instruction is detected, the first or second level block number of branch target instruction is directly derived from the one read out from the micro active list; or otherwise sending branch target address to active list for further match.

Optionally, each track has an ending track point after the last entry corresponding to the last instruction in the instruction block; the ending track point stores the first address of the next track (instruction block) to be executed in order.

Optionally, after reading out the content of the current track table entry addressed by a read pointer of the tracker, the read pointer is moved to the track table entry succeeding to the current track table entry.

Optionally, after reading out the content of the current track table entry addressed by a read pointer of the tracker, the read pointer is moved to the track table entry corresponding to the first branch instruction after the current instruction corresponding to the current track point, based on the instruction type recorded in the track.

Optionally, the read pointer is moved to the table entry corresponds to the first branch instruction further includes: reading out the branch instruction types on the entire track; shifting the read out instruction types by the block offset portion of the pointer so the types before the current instruction are discarded.

Optionally, further includes detects the position of the first branch type after shifting; and summing the position with the block offset part of the pointer to obtain the next pointer.

Optionally, a memory replacement method using a track table, a first memory containing multiple rows instruction blocks, and a correlation table, comprising: storing instructions in one or more rows of instruction blocks in the first memory; storing, in the track table, track addresses of the instructions in the first memory, wherein every track address includes a row address and a column address; recording, in every row in the correlation table, a count of total number of source rows that use the row as an index target in the track table and certain number of source addresses of the said source rows, where the correlation table and the first memory have a same number of rows; and when a new instruction block is being filling into the first memory, based on a record in the correlation table, selecting and replacing a row in the first memory.

Optionally, selecting and replacing a row in the first memory based on a record in the correlation table includes: recording by every row in the correlation table the lower level memory address of the corresponding memory row in the first memory.

Optionally, when the memory replacement is performed, selecting the memory row in first memory corresponding to the row of the correlation table as the replacement candidate, wherein the count number recorded in the row of the correlation table equals to the number of valid source row addresses recorded in the same row of the correlation table.

Optionally, when the replacement is performed, using the source addresses store in the correlation table row corresponding to the replacement candidate to identify all source track table entries containing the track address indexing the replacement candidate; and replacing each the track address in the source track table entries with the lower memory address recorded in the corresponding row of the correlation table.

DETAILED DESCRIPTION

Reference will now be made in detail to exemplary embodiments of the invention, which are illustrated in the accompanying drawings. The same reference numbers may be used throughout the drawings to refer to the same or like parts.

It is noted that, in order to clearly illustrate the contents of the present disclosure, multiple embodiments are provided to further interpret different implementations of this disclosure, where the multiple embodiments are enumerated rather than listing all possible implementations. In addition, for the sake of simplicity, contents mentioned in the previous embodiments are often omitted in the following embodiments. Therefore, the contents that are not mentioned in the following embodiments can be referred to in the previous embodiments.

Although this disclosure may be expanded using various forms of modifications and alterations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions, and modifications based on spirit or scope defined by the claims in the disclosure. The same reference numbers may be used throughout the drawings to refer to the same or like parts.

A cache system including a processor core is illustrated in the following detailed description. The technical solutions of the invention may be applied to cache system including any appropriate processor or processors. Further, the processor can include multiple cores for multi-thread or parallel processing. For example, the processor may be General Processor, central processing unit (CPU), Micro Control Unit (MCU), digital signal processor (DSP), graphics processing unit (GPU), system on a chip (SOC), application specific integrated circuits (ASIC), etc.

Figure 1:
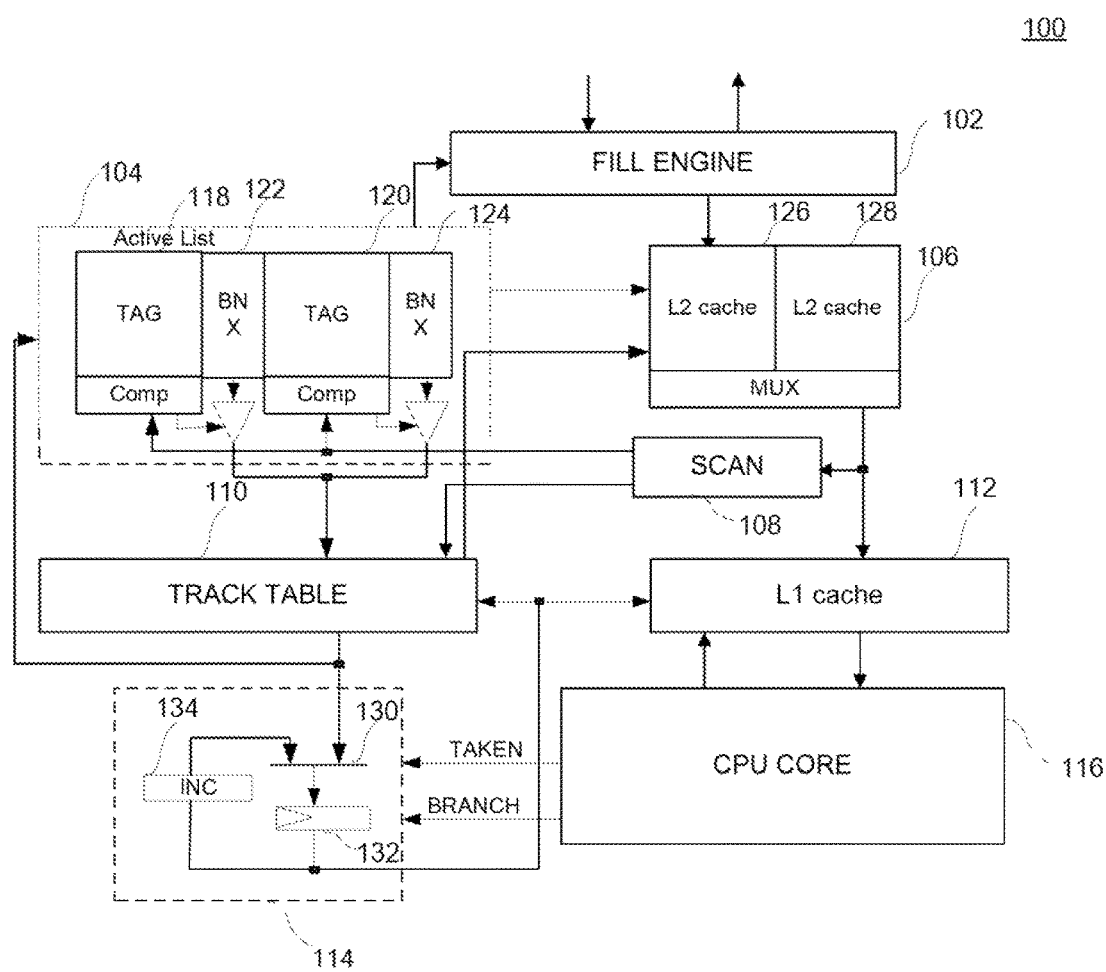
FIG. 1 illustrates a structure schematic diagram of an exemplary multi-way set associative two level cache system of prefetching instructions consistent with the disclosed embodiments.

FIG. 1 illustrates a structure schematic diagram of an exemplary multi-way set associative two level cache system 100 of prefetching instructions consistent with the disclosed embodiments. As shown in FIG. 1, the two level cache system 100 includes an active list 104, a scanner 108, a track table 110, a tracker 114, a level two (L2) instruction cache 106, a level one (L1) instruction cache 112 and a processor core 116 (e.g., a CPU core). It is understood that the disclosed components or devices are for illustrative purposes and not limiting, certain components or devices may be omitted and other components or devices may be included. Further, the various components may be distributed over multiple systems, may be physical or virtual, and may be implemented in hardware (e.g., integrated circuitry), software, or a combination of hardware and software.

Instruction address refers to memory address of an instruction stored in a main memory. That is, the instruction can be found in the main memory based on the instruction address. For simplicity, it is assumed that a virtual address equals to a physical address. The method described in the present invention may be also applied to the situation that address mapping operations need to be performed.

A branch instruction or a branch source refers to any appropriate instruction type that may make the processor core 116 to change an execution flow (e.g., an instruction is not executed in sequence). The branch instruction or branch source means an instruction that executes a branch operation. A branch source address may refer to the address of the branch instruction itself; a branch target may refer to a target instruction that is branched to by a branch instruction; a branch target address may refer to an address that is branched to if the branch is taken successfully, that is, the instruction address of the branch target instruction. A current instruction may refer to an instruction that is executed or obtained currently by the processor core. A current instruction block may refer to an instruction block containing the instruction being executed currently by the processor core 116.

L1 instruction cache 112 is a fully associative cache. Each storing row in L1 instruction cache 112 is called a L1 instruction block. L1 instruction cache 112 stores at least one L1 instruction block including a segment of continuous instructions containing the current instruction. L1 instruction cache 112 contains a plurality of L1 instruction blocks. Each L1 instruction block contains a plurality of instructions. Each L1 instruction block stored in L1 instruction cache 112 has one L1 block number (BNX1). The L1 block number (BNX1) is the row number of the L1 instruction block in L1 instruction cache 112. L2 instruction cache 106 is constituted by cache memory block 126 and cache memory block 128, where every cache memory block constitutes a way set, and the number of rows in every way set is the same. That is, the L2 instruction cache 106 is a 2-way set associative cache memory. Each memory row in cache memory block 126 and cache memory block 128 is called a L2 instruction block. Every L2 instruction block has a L2 block number (BNX2). The L2 block number (BNX2) is determined by a row number of the L2 instruction block in L2 instruction cache 106 and a way set containing the instruction in L2 instruction cache 106. That is, the L2 block number (BNX2) is determined by adding an index bit of the instruction address to a way set number in L2 instruction cache 106. Every L2 instruction block includes a plurality of L1 instruction blocks. The L2 block number (BNX2) is the position of the L2 instruction block in L2 instruction cache 106.

The L2 instruction cache 106 and the L1 instruction cache 112 may include any appropriate storage devices such as register, register file, static RAM (SRAM), dynamic RAM (DRAM), flash memory, hard disk, Solid State Disk (SSD), and any appropriate storage device or future new form of storage device. The L2 instruction cache 106 may function as a cache for the system or a level one cache if other caches exist. The L2 instruction cache 106 may be separated into a plurality of memory segments which are named memory blocks for storing data to be accessed by the processor core 116, for example, an instruction in the instruction block.

Active list 104 contains a tag array 118, a tag array 120, a memory array 122 and a memory array 124. The memory array 122 and the memory array 124 are used to store the BNX1. Because the L2 instruction cache 106 is a 2-way set associative cache, the active list 104 is also constituted by a 2-way set form. One tag array and one memory array in the active list 104 correspond to one way set of the L2 instruction cache 106. That is, the tag array 118 and the memory array 122 correspond to one way set (i.e. cache memory block 126) of the L2 instruction cache 106. The tag array 120 and the memory array 124 correspond to one way set (i.e. cache memory block 128) of the L2 instruction cache 106. The element that forms the memory array 122 and the memory array 124 is called an entry. Every entry stores the BNX1 and a valid bit for storing a relationship of the L1 instruction block in the L1 instruction cache and the L2 instruction cache. Every L2 instruction block contains a plurality of L1 instruction blocks. Therefore, every row in the memory array 122 and the memory array 124 of the active list 104 contains a plurality of entries, and every entry stores a row number (BNX1) at which the L1 instruction block in the L2 instruction block locates in the L1 instruction cache 112.

The scanner 108 may examine L1 instruction block filled from L2 instruction cache 106 into L1 instruction cache 112, obtain instruction type information and determine whether an instruction is a branch instruction or a non-branch instruction. If it is determined that the instruction is a branch instruction, the scanner 108 calculates the target address of the branch instruction. The target address of the branch instruction is calculated by adding a current instruction address to a branch distance using an adder. Then, the target address of the branch instruction is sent to active list 104 to perform a matching operation.

There is a one-to-one correspondence between every row in the track table 110 and every row in the L1 instruction cache 112. Both the row in the track table 110 and the corresponding row in the L1 instruction cache 112 are pointed to by a same row pointer. Every row in the track table 110 includes a plurality of track points. Each track point in the track table 110 corresponds to an instruction of the corresponding row in the L1 instruction cache 112. That is, the number of track points of each row in the track table 110 is the same as the number of instructions of the corresponding row in the L1 instruction cache 112. A track point is a single entry in the track table 110 containing information of at least one instruction, such as information about instruction type, branch target address, etc. As used herein, a track table address of a track point corresponds to an instruction address of the instruction represented by the track point. The track point of a branch instruction includes the branch target address which corresponds to the branch target instruction address. A plurality of continuous track points corresponding to an instruction block containing a series of contiguous instructions in the L1 instruction cache 112 is called a track. The instruction block and the corresponding track are indicated by the same BNX1. The track table includes at least one track. A total number of track points in a track may equal to a total number of entries in one row of the track table 110. Other configurations may also be used in the track table 110.

When processor core 116 fetches an instruction from L1 instruction cache 112 according to the requirement, if the instruction is not stored in L1 instruction cache 112 and L2 instruction cache 106, based on the instruction address (PC), the instruction is filled into a L2 instruction block pointed to by BNX2 which is determined by a replacement policy (e.g., least-recently used (LRU)) in L2 instruction cache 106 from lower level memory. Then, according to the requirement of processor core 116, the corresponding L1 instruction block in L2 instruction cache 106 is filled into a memory row pointed to by a BNX1 which is determined by a replacement policy (e.g., LRU) in L1 instruction cache 112. When determining which memory row is to be replaced, a replacement policy such as first in first out (FIFO), least-recently used (LRU), random or least frequently used (LFU) may be used herein. The scanner 108 may examine instruction type of the L1 instruction block. If the scanner 108 finds an instruction is a branch instruction, the scanner 108 extracts branch information of the branch instruction and calculates a target address of the branch instruction. For example, the target address of the branch instruction may be calculated by adding the current instruction address to a branch distance by using an adder. As used herein, the term "fill" means to move an instruction from a lower level memory (e.g., an external memory) to a higher level memory (e.g., an instruction cache).

The target address of the branch instruction obtained by the scanner 108 matches with an instruction row address stored in active list 104 to determine whether the branch target instruction is stored in L2 instruction cache 106. At the beginning, two tags stored in active list 104 are read out by using an index bit of the target address of the branch instruction. The two tags are compared with the tag bit of the target address of the branch instruction. If any one of the two tags is matched successfully, the entry corresponding to the instruction in the way set that is matched successfully is selected using the block-offset of the calculated branch target instruction address. If the BNX1 stored in the entry is valid (it indicates that the branch target instruction is stored in L1 instruction cache 112), the BNX1 stored in the active list 104 and the offset of the target address of the branch instruction together are written into the track table. The written position is the track point of the track table corresponding to the branch source address. If BNX1 stored in the entry is invalid (it indicates that the branch target instruction is not stored in L1 instruction cache 112, while the branch target instruction is stored in L2 instruction cache 106), the BNX2 corresponding to the instruction, the block-offset of the target address of the branch instruction and the offset of the target address of the branch instruction together are written into the track table. The written position is the track point of the track table corresponding to the branch source address. If the two tags are not matched successfully (it indicates that the instruction block containing branch target instruction is not filled into L2 instruction cache 106), based on the calculated branch target instruction address, the instruction is filled into a L2 instruction block pointed to by the BNX2 which is determined by a replacement policy (e.g., least-recently used (LRU)) in L2 instruction cache 106 from the lower memory. The BNX2, the block-offset of the branch target instruction address and the offset of the branch target instruction address together are written into the track table. The written position is the track point of the track table corresponding to the branch source address. As used herein, the term "match" means to compare two values. When the two values are the same or equal, that is matched; otherwise, that is Not Match.

The position information of a track point (an instruction) in the track table may be represented by a first address and a second address, where the first address represents a block number of an instruction corresponding to the track point (pointing to a track of the track table and a corresponding L1 instruction block in the L1 instruction cache), and the second address represents the address offset of the track point (the corresponding instruction) in the track (memory block). A track point in the track table corresponds to a pair of the first address and the second address. That is, based on a pair of the first address and the second address, the corresponding track point in the track table may be found. If the instruction type of the track point in the track table represents a branch instruction, based on the first address contained in the contents stored in the entry in the track table, the track of the branch target is determined. Then, based on the second address, a specific track point of the target track is determined. Thus, the track table becomes a table that a branch instruction is represented by a branch source address corresponding to the address of the entry in the track table and a branch target address corresponding to the contents of the entry in the track table.

In order to create a relationship between one track in the track table 110 and the next track to be executed in order, an ending track point is created after the track point representing the last instruction in every track. The ending track point stores the first address of the next track (instruction block) to be executed in order. If multiple instruction blocks can be stored in the L1 instruction cache 112, when the current instruction block is executed, the next instruction block to be executed in order is also fetched to an instruction read buffer for processor core 116 to execute. The instruction address of the next instruction block is obtained by adding the length of the address of an instruction block to the instruction address of the current instruction block. The instruction address is sent to active list 104 to perform a matching operation. The obtained instruction block is filled into the instruction block indicated by the replacement policy in L1 instruction cache 112. The instructions in the next instruction block filled recently into L1 instruction cache 112 are also scanned by the scanner 108. The extracted information is filled into the track indexed by the BNX1 as the method described above. In general, a replacement policy such as FIFO, LRU, Radom or LFU may be also used.

The tracker 114 mainly includes a multiplexer 130, a register 132 and an incrementer 134. The read pointer of the tracker 114 points to the track point of the first branch instruction after the current instruction in the track containing the current instruction in the track table 110; or the read pointer of the tracker 114 points to the ending track point of the track if there is no branch track point after the current instruction in the track. The read pointer of the tracker 114 is constituted by the pointer of the first address and the pointer of the second address, where the value of the pointer of the first address is the L1 block number (BNX1) of the L1 instruction block containing the current instruction (i.e. row pointer), and the value of the pointer of the second address points to the track point of the first branch instruction after the current instruction in the track or the ending track point.

When processor core 116 fetches the instruction from L1 instruction cache 112 according to the requirement, the tracker 114 provides the BNX1 to perform an addressing operation for the L1 instruction block, and processor core 116 provides an offset to fetch the corresponding instruction. Processor core 116 also provides a TAKEN signal and a BRANCH signal for the tracker 114. The BRANCH signal indicates whether the instruction is a branch instruction. The TAKEN signal controls the output of a multiplexer. The tracker 114 points to the first branch instruction after the current instruction; or the tracker 114 points to the ending track point of the track when there is no track point of the branch instruction after the current instruction in the track. The tracker 114 also provides the BNX1 of the current instruction for processor core 116.

When the content stored in the track point pointed to by the read pointer of the tracker 114 includes a BNX1 (it indicates the corresponding instruction is stored in L1 instruction cache 112), processor core 116 directly fetches the instruction from L1 instruction cache 112 when the instruction is executed. When the content stored in the track point pointed to by the read pointer of the tracker 114 includes a BNX2, the BNX2 is used as an active list address to be searched in the active list. If the BNX1 stored in the entry corresponding to the BNX2 is valid, it indicates that, before the instruction is executing, the target address of other branch instruction is the same as the instruction address corresponding to the BNX2, and the target instruction is fetched into L1 instruction cache 112. Therefore, the BNX1 is written into the track point. Thus, processor core 116 directly fetches the instruction from L1 instruction cache 112 when the instruction is executing. If the BNX1 stored in the entry corresponding to the BNX2 is invalid (it indicates the target instruction is not stored in L1 instruction cache 112), based on the replacement policy, a BNX1 is determined. Thus, the target instruction is fetched from L2 instruction cache 106 and filled into the corresponding L1 instruction block in L1 instruction cache 112. And the BNX1 is written into the corresponding entry in memory array 122 or memory array 124 in active list 104. Thus, processor core 116 directly fetches the instruction from L1 instruction cache 112 when the instruction is executed.

If the branch instruction pointed to by the tracker 114 does not taken, the read pointer of the tracker 114 points to the track point of the first branch instruction after the branch instruction; or the read pointer of the tracker 114 points to the ending track point of the track when the track point of the branch instruction does not exist in the track points after the branch instruction. The processor core 116 reads out the instruction to be executed in sequence after the branch instruction.

If the branch instruction pointed to by the tracker 114 is taken, the branch target instruction block read out from the L2 instruction cache 106 is stored in the instruction block specified by the buffer replacement logic of the instruction read buffer, and new track information generated by scanner 108 is filled into the corresponding track in the track table 110. The first address and the second address of the branch target become a new tracker address pointer, pointing to the track point corresponding to the branch target in the track table. The new tracker address pointer also points to the recently filled branch instruction block which is used to become a new current instruction block. The processor core 116 selects the needed instruction by using the offset of the instruction address (PC) from the new current instruction block. Then, the read pointer of the tracker 114 moves and points to the track point of the first branch instruction after the branch target instruction in the track corresponding to the new current instruction block; or the read pointer of the tracker 114 points to the ending track point of the track when the track point of the branch instruction does not exist in the track points after the branch instruction.

If tracker 114 points to the ending point of the track, the read pointer of tracker 114 is updated to the position content value of the ending track point, that is, the pointer points to the first track point of the next track, thereby pointing to the new current instruction block. Then, the read pointer of the tracker 114 moves and points to the track point of the first branch instruction in the track corresponding to the new current instruction block; or the read pointer of the tracker 114 points to the ending track point of the track when the track point of the branch instruction does not exist in the track. The above described procedure is repeated in sequence. The instruction may be filled into the instruction read buffer before the instruction is executed by the processor core 116. The processor core 116 may fetch the instruction without waiting, therefore improving the performance of the processor.

Figure 2:
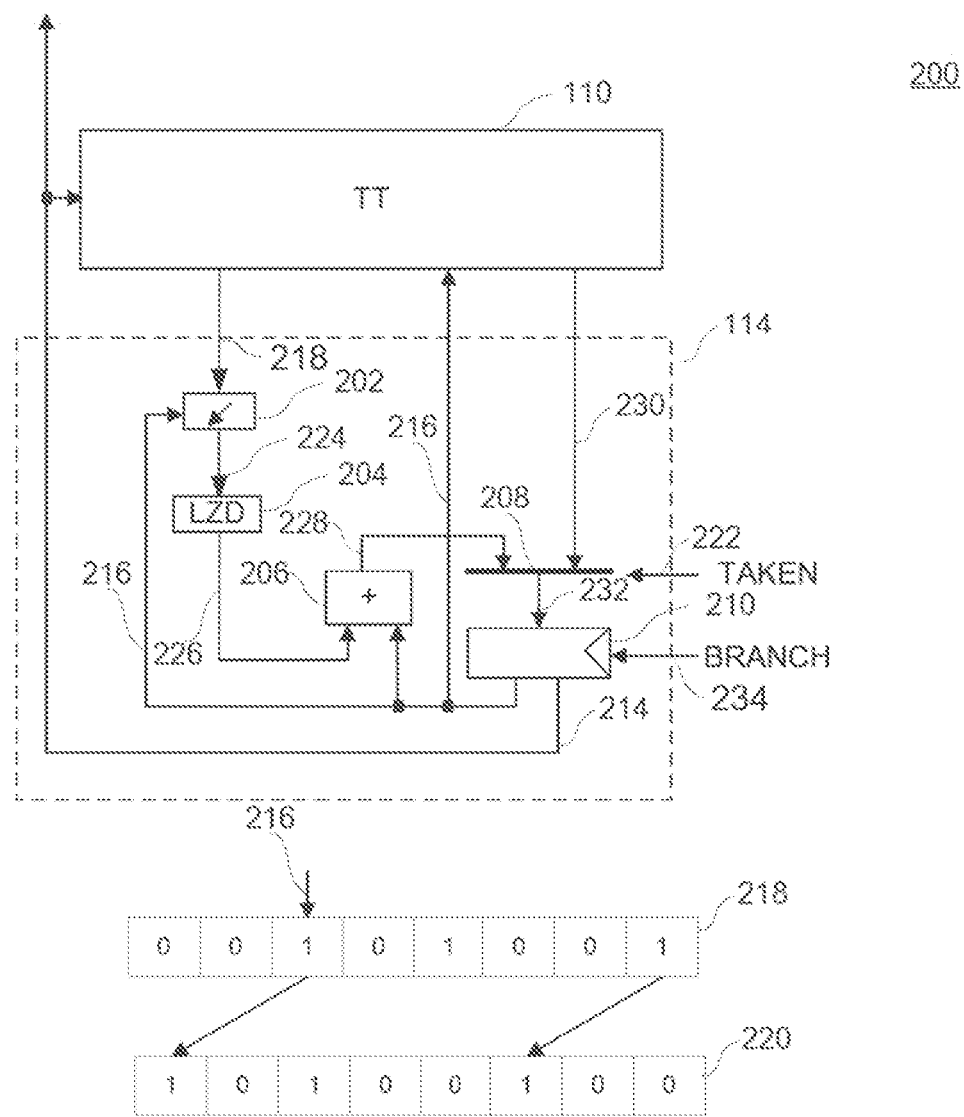
FIG. 2 illustrates an exemplary movement of a read pointer of a tracker consistent with the disclosed embodiments.

FIG. 2 illustrates an exemplary movement of the read pointer of the tracker consistent with the disclosed embodiments. As shown in FIG. 2, the read pointer of the tracker skips the non-branch instructions in the track table, and moves to the succeeding branch point after the current instruction of the track table to wait for branch decision generated by the processor core 116. Certain parts or components may be omitted in FIG. 2. In one embodiment, assuming that the instruction type stored in the track table 110 and the instruction information stored in the track table 110 are arranged from left to right based on the instruction address from small to large. That is, when these instructions are executed in sequence, information access order of each instruction and the corresponding instruction type is from left to right. It is also assumed that the instruction type '0' in the track table 110 indicates that the corresponding instruction in the track table 110 is a non-branch instruction, and the instruction type '1' in the track table 110 indicates that the corresponding instruction in the track table 110 is a branch instruction. The entry representing the instruction pointed to by a second address 216 (an offset, BNY) in a track pointed to by a first address 214 (L1 block number, BNX1) in the track table 110 may be read out at any time. A plurality of entries, even all entries on behalf of the instruction type in a track pointed to by the first address 214 in the track table 110 may be read out at any time.

On the right of the entry of the instruction with the largest instruction address in each row of the track table 110, an end entry is added to store the address of the next instruction being executed in sequence. The instruction type of the end entry is always set to '1'. The first The first address of the instruction information in the end entry is an instruction block number of the next instruction in sequence. The second address (BNY) is always set to zero and points to the first entry of the instruction track. The end entry is defined as an equivalent unconditional branch instruction. When the tracker points to an end entry, an internal control signal is always generated to make multiplexer 208 to select the output 230 of the track table 110, and another internal control signal is also generated to update the value of register 210. The internal signal may be triggered by the special bit in the end entry of the track table 110 or the end entry pointed to by the second address 216.

In FIG. 2, the tracker 114 mainly includes a shifter 202, a leading zero counter 204, an adder 206, a multiplexer 208 and a register 210. A plurality of instruction types 218 representing a plurality of instructions read out from the track table 110 are shifted to the left by shifter 202. The shifting bits are determined by the second address pointer 216 outputted by the register 210. The most left bit of the shifted instruction type 224 outputted by the shifter 202 is a step bit. The signal of the step bit and BRANCH signal from the processor core together determines the update of the register 210. The multiplexer 208 is controlled by the TAKEN signal. The output 232 of the multiplexer is the next address, which includes the first address portion and the second address portion. When TAKEN is '1' (a branch is taken), the multiplexer 208 selects output 230 of the track table 110 (including the first address and the second address of the branch target) as the output 232. When TAKEN is '0' (a branch is not taken), the multiplexer 208 selects the current first address 214 as the first address portion of the output 232 and the output 228 of the adder as the second address portion of the output 232. Instruction type 224 is sent to the leading zero counter 204 to calculate the number of '0' instruction type (representing the corresponding instruction is a non-branch instruction) before the first '1' instruction type (representing the corresponding instruction is a branch instruction). The step bit is calculated as a (one) '0' regardless of the step bit is a '0' or '1'. The number 226 (step number) of the leading '0' is sent to the adder 206 to be added with the second address 216 outputted by the register 210 to obtain the next branch source address 228. It should be noted that the next source branch address is the second address of the next branch instruction of the current instruction, and non-branch instructions before the next branch instruction of the current instruction are skipped by the tracker 114.

When the second address 216 points to an entry representing an instruction, the shifter controlled by the second address shifts a plurality of the instruction types outputted by the track table 110 to the left. At this moment, the instruction type representing the instruction read out by the track table 110 is shifted to the most left step bit of the instruction type 224. The shift instruction type 224 is sent into the leading zero counter to count the number of the instructions before the next branch instruction. The output 226 of the leading zero counter 204 is a forward stride of the tracker. This stride is added to the second address 216 by the adder 206. The result of the addition operation is the next branch instruction address 228.

When the step bit signal of the shifted instruction type 224 is '0', which indicates that the entry of the track table 110 pointed to by the second address 216 is a non-branch instruction, the step bit signal controls the update of the register 210; the multiplexer 208 selects next branch source address 228 as the second address 216 under the control of TAKEN signal 222 '0' and the first address 214 remains unchanged. The new first and second address point to the next branch instruction in the same track and non-branch instructions before the branch instruction are skipped. The new second address controls the shifter 216 to shift the instruction type 218, and the instruction type bit representing the branch instruction is placed in the step bit of instruction type 224 for the next operation.

When the step bit signal of the shifted instruction type 224 is '1', it indicates that the entry in the track table 110 pointed to by the second address represents a branch instruction. The step bit signal does not affect the update of the register 210, while BRANCH signal 234 from the processor core controls the update of the register 210. The output 228 of the adder is the next branch instruction address of the current branch instruction in the same track, while the output 230 of the memory is the target address of the current branch instruction.

When the BRANCH signal is '1', the output 232 of the multiplexer 208 updates the register 210. If TAKEN signal 222 from the processor core is '0', it indicates that the processor core determines to execute operations in sequence at this branch point. The multiplexer 208 selects the source address 228 of the next branch. The first address 214 outputted by the register 210 remains unchanged, and the next branch source address 228 becomes a new second address 216. The new first address and the new second address point to the next branch instruction in the same track. The new second address controls the shifter 216 to shift the instruction type 218, and the instruction type bit representing the branch instruction is placed in the step bit of instruction type 224 for the next operation.

If the TAKEN signal 222 from the processor core is '1', it indicates that the processor core determines to jump to the branch target at this branch point. The multiplexer selects the branch target address 230 read out from the track table 110 to become the first address 214 outputted by the register 210 and the second address 226. At this time, the BRANCH signal 234 controls the register 210 to latch the first address and the second address as the new first address and the new second address, respectively. The new first address and the new second address may point to the branch target addresses that are not in the same track. The new second address controls the shifter 216 to shift the instruction type 218, and the instruction type representing the branch instruction bit is placed in the step bit of instruction type 224 for the next operation.

When the second address points to the end entry of the track table (the next line entry), as the previously described, the internal control signal controls the multiplexer 208 to select the output 230 of the track table 110 and update the register 210. At this time, the new first address 214 is the first address of the next track recorded in the end entry of the track table 110, and the second address is zero. The second address controls the shifter 216 to shift the instruction type 218 to zero bit for starting to perform the next operation. The operation is performed repeatedly, therefore the tracker 114 may work together with the track table 110 to skip non-branch instructions in the track table and always point to the branch instruction.

Figure 3:
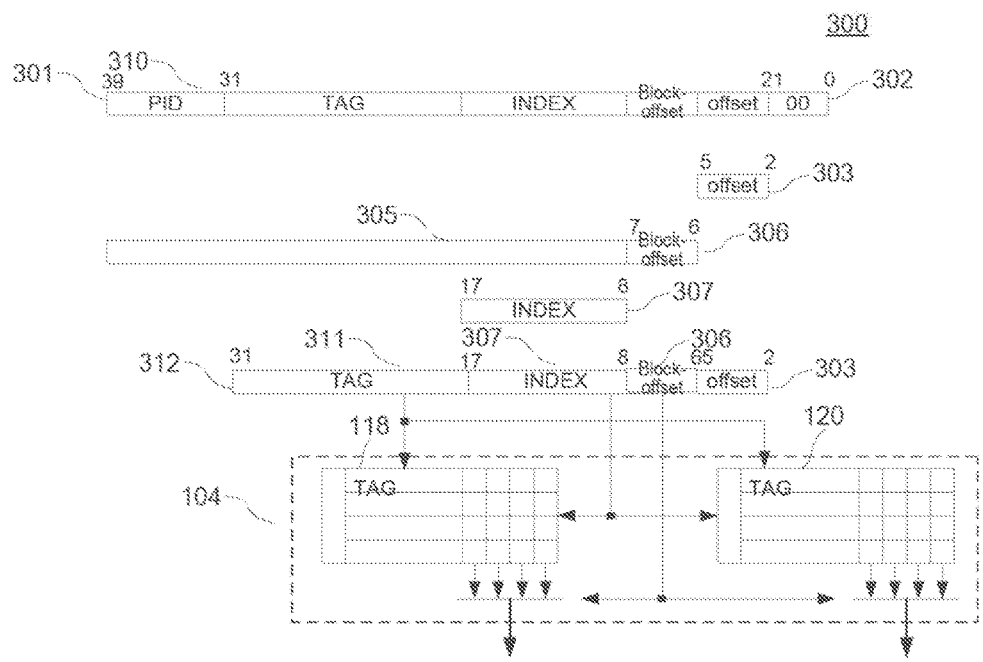
FIG. 3 illustrates an exemplary relationship between a L1 instruction block and a L2 instruction block consistent with the disclosed embodiments.

FIG. 3 illustrates an exemplary relationship between a L1 instruction block and a L2 instruction block consistent with the disclosed embodiments. As shown in FIG. 3, it is assumed that the length of the instruction address 301 is 40 bits (that is, the high-order bit is the 39th bit, the low-order bit is No. 0 bit), and each instruction address corresponds to a byte. Therefore, the lowest two bits 302 of the instruction address 301 (i.e., the 1st bit and No. 0 bit) corresponds to 4 bytes of an instruction word. The highest 8 bits of instruction address 301 are the process ID (PID) 310 representing the currently executing process. The PID 310 can determine whether the currently executing process is stored in the instruction cache. If the currently executing process is not stored in the instruction cache, a prefetching operation is executed by the instruction line address 301, thus avoiding the instruction miss in the instruction cache. The instruction address 301 may not contain the process ID (PID) 310, thus the length of the instruction address is 32 bits. For illustration purposes, the lowest two bits 302 and the highest 8 bits of instruction address 301 are removed, a new instruction address 312 with the remaining 30 bits (i.e., the 31st bit to the 2nd bit) is described below.

Assuming a L1 instruction block contains 16 instructions, so the offset 303 of the instruction address 312 has 4 bits. The offset can be used to determine the location of one instruction in the L1 instruction block. The offset 303 corresponds to the second address (BNY) described in FIG. 1. Therefore, the offset can also be used to determine the track point of the track table corresponding to the instruction. Assuming the track table has 512 rows, the L1 block number BNX1 has 9 bits, and the value is determined by the row number. Therefore, when the L1 instruction block from L2 instruction cache 106 is filled into L1 instruction cache 112 according to the needs of processor core 116, if it is determined that the branch target instruction of the branch instruction is stored in L1 instruction cache 112 based on the above described method, the corresponding L1 block number BNX1 stored in active list 104 concatenate the offset 303 are written into the track point in the track table corresponding to the branch source instruction. When processor core 116 executes the branch instruction, the branch instruction is read out directly from the L1 instruction cache 112.

The tag bit 311 of the instruction address 312 stored in tag array 118 or tag array 120 in one way set of the active list 104 is used to compare the target instruction address generated by the scanner 108 to obtain matching information. If the active list 104, the L2 instruction cache memory block 126 and 128 all have 1024 rows, the index bit 307 of the instruction address 312 has 10 bits (i.e. from the 17th to the 8th bit). The index bit 307 is used to index which row the L2 instruction block is located in the L2 instruction cache. The index bit 307 is also used to read out the tag stored in the tag array 118 and the tag array 120, and the valid value stored in the entries corresponds to every way set of the active list. It assumes that a L2 instruction block stored in the L2 instruction cache block 126 or 128 corresponds to 4 consecutive L1 instruction blocks, block-offset 306 has two bits (i.e. the 6th and the 7th). Block-offset 306 is used to select the L1 instruction block in the L2 instruction block stored in L2 cache 106. That is, block-offset 306 is used to select a valid value corresponds to the entry in the active list. Therefore, the way set number of the L2 instruction cache 106 which contains the L2 instruction block concatenates index bit 307 of the instruction address 312 to constitute a BNX2. Therefore, when the L1 instruction block from L2 instruction cache 106 is filled into L1 instruction cache 112 according to the needs of processor core 116, if it is determined that the branch target instruction of the branch instruction is not stored in L1 instruction cache 112 but stored in L2 instruction cache 106 based on the above described method, the sum of the corresponding L2 block number BNX2, block-offset 306 and offset 303 is written into the track point in the track table corresponding to the branch source instruction. When the pointer of the tracker points to the track point, the corresponding L1 instruction block from L2 instruction cache 106 is filled into the L1 cache block pointed to by BNX1 determined by the replacement policy (e.g., LRU) in L1 instruction cache 112. When processor core 116 executes the branch instruction, the branch instruction is read out directly from the L1 instruction cache 112.

As used herein, a mapping relationship of an instruction is created between the L1 instruction cache and the L2 instruction cache. The L1 block number BNX1 concatenates the offset 303 of instruction address 312 determine the location of the instruction in the L1 instruction block stored in L1 instruction cache 112. The block-offset 306 of instruction address 312 may determine the location of the L1 instruction block in the L2 instruction block stored in L2 instruction cache 106. The way set number of the L2 instruction block in the L2 instruction cache 106 concatenates index bit 307 of the instruction address 312 to constitute a BNX2, and the BNX2 may determine the location of the L2 instruction block stored in L2 instruction cache 106. It should be noted that although the BNX1 and the BNX2 do not have a necessary mapping relationship, the L1 block number BNX1 is determined by the replacement algorithm (such as a LRU algorithm) when the L1 instruction block from L2 instruction cache 106 is filled into L1 instruction cache 112. And the second address BNY indicating the location of the instruction in the L1 instruction cache and the second address BNY indicating the location of the instruction in the L2 instruction cache are the same, which are the offset 303 of instruction address 312. Therefore, the mapping relationship of an instruction is created between the L1 instruction cache and the L2 instruction cache.

Figure 4:
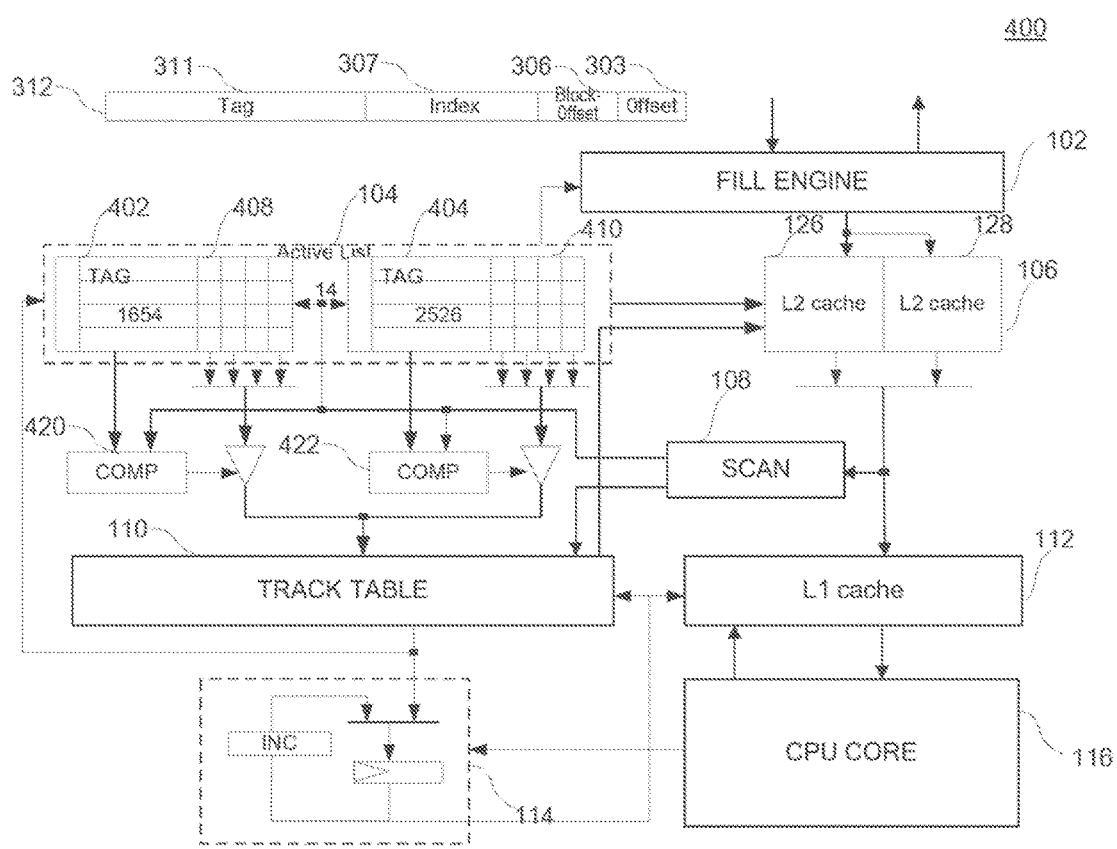
FIG. 4 illustrates an exemplary 2-way set associative two level cache system consistent with the disclosed embodiments.

FIG. 4 illustrates an exemplary 2-way set associative two level cache system 400 consistent with the disclosed embodiments. As shown in FIG. 4, a target instruction address generated by scanner 108 may match with an instruction address stored in active list 104 to obtain matching information of the instruction address. Then, a BNX2 or a BNX1 is written into track table 110 to form a new track.

For illustration purposes, the target instruction address 312 is described using a part of the entire instruction address. The target instruction address 312 includes a tag bit 311, an index bit 307, a block-offset 306 and an offset 303. The tag bit 311 is used to compare with tag 302 and tag 304 in active list 104 to obtain the matching information. The index bit 307 is used to index a row in the active list 104 corresponding to the address. The block-offset 306 is used to select a corresponding L1 instruction block in a L2 instruction block. The offset 303 is used to determine the position of the target instruction in the L1 instruction row, that is, the second address BNY.

The L2 instruction cache 106 is constituted by a cache memory block 126 and a cache memory block 128, where every memory block constitutes a way set, and the number of rows in every memory block is the same. That is, the L2 instruction cache 106 is a 2-way set associative cache memory. Correspondingly, the active list 104 is also constituted by a 2-way set associative form. The active list 104 is constituted by a first part including tag array 118 and tag array 120, as well as a second part including memory block 408 and memory block 410. The first part including tag array 118 and 120 is used to match with the target instruction address generated by scanner 108. The second part is used to store BNX1. A L2 instruction block stored in every set (i.e. the L2 instruction cache block 126 or 128) of L2 cache 106 corresponds to 4 consecutive L1 instruction blocks, therefore one row in every set of the active list 104 corresponds to 4 entries of memory block 408 or memory block 410. The number of rows in both the active list 104 and the track table is the same (i.e. 1024 rows). Every row in L1 instruction cache 112 contains 16 instructions. That is, the L1 instruction block contains 16 instructions. Therefore, every row in the track table 110 has 16 entries.

It is assumed that a L1 instruction block fetched from the L2 instruction cache 106 is filled into the 3rd row of the L1 instruction cache 112 according to an LRU replacement policy. The L1 instruction block contains 3 branch instructions, and the 3 branch instructions are at the 4th instruction, the 7th instruction and the 11th instruction in the L1 instruction block. It is assumed that the value "1654" is stored in the tag of the 14th row of a set 0 in the active list 104, and the value "2526" is stored in the tag of the 14th row of a set 1 in the active list 104. It is also assumed that a valid bit of entry 2 corresponding to the 14th row of the set 0 in the active list is "1"; a valid bit of entry 3 corresponding to the 14th row of the set 0 in the active list is "0"; and a valid bit of entry 2 corresponding to the 14th row of the set 1 in the active list is "0".

When the scanner 108 scans the L1 instruction block, the scanner 108 calculates and obtains the target instruction address of the first branch instruction is "1654|14|2|3". That is, the value of tag bit 311 corresponding to the target instruction address 312 is "1654"; the value of index bit 307 corresponding to the target instruction address 312 is "14"; the value of block-offset 306 corresponding to the target instruction address 312 is "2"; and the value of offset 303 corresponding to the target instruction address 312 is "3". At the beginning, based on the current technology, index bit 307 is used to read out two valid tags stored in the 14th row in the active list. Then, the two valid tags are sent respectively to a comparator 420 and a comparator 422 to compare with tag bit 311 of the branch target instruction address 312 calculated by the scanner 108. The set "0" is matched successfully. Further, the corresponding 2nd entry in the active list is selected by using the block-offset 306 of the target instruction address 312. At this time, the valid bit of the 2nd entry is "1". The value "5" stored in the entry is written into the 4th entry of the 3rd row in the track table. At the same time, the value "3" of BNY is also written into the 4th entry of the 3rd row in the track table. That is, "5|3" is written into the 4th entry of the 3rd row in the track table.

When the target instruction address of the second branch instruction calculated and obtained by the scanner 108 is "1654|14|3|5", it indicates that the value of tag bit 311 corresponding to the target instruction address 312 is "1654"; the value of index bit 307 corresponding to the target instruction address 312 is "14"; the value of block-offset 306 corresponding to the target instruction address 312 is "3"; and the value of offset 303 corresponding to the target instruction address 312 is "5". According to the previous method, the value of the corresponding 3rd entry in the 14th row in the set 0 of the active list is selected. At this time, the valid bit of the entry 2 is "0". It indicates that the branch instruction is not in L1 instruction cache 112. The way set number of the branch instruction in the active list concatenates the index bit 307 of the target instruction address as a BNX2 and the BNX2 concatenates the block offset 307 and offset (BNY) 303 are written into the track table. That is, "0|14|3|5" is written into the 7th entry of the 3rd row in the track table, where "0" indicates that the instruction corresponds to the set 0 of the active list; "14" indicates that the target instruction corresponds to the 14th row in the active list; "3" indicates that the instruction corresponds to the 3rd entry in the active list; and "5" indicates that the instruction corresponds to the 5th instruction of the L1 instruction block.

When the target instruction address of the third branch instruction calculated and obtained by the scanner 108 is "3546|14|2|8", it indicates that the value of tag bit 311 corresponding to the target instruction address 312 is "3546"; the value of index bit 307 corresponding to the target instruction address 312 is "14"; the value of block-offset 306 corresponding to the target instruction address 312 is "2"; and the value of offset 303 corresponding to the target instruction address 312 is "8". According to the previous method, because matching with any entry of the active list is unsuccessful, it indicates that the instruction is not in the L2 instruction cache. Based on the target address, the corresponding instruction block is filled into L2 instruction cache 106. Based on a LRU replacement policy, the instruction block is filled into the second entry in the 14th row of the set 1 in L2 instruction cache 106. The way set number of the branch instruction in the active list concatenates the index bit 307 of the target instruction address as a BNX2 and the BNX2 concatenates the block offset 307 and offset (BNY) 303 are written into the track table. That is, "1|14|2|8" is written into the 11th entry of the 3rd row in the track table. The replacement policy such as FIFO, LRU, Radom or LFU may also be used.

When the read pointer of the tracker 114 points to the 4th entry of the 3rd row in the track table, the read out value "5|3" stored in the track point includes a BNX1 (it indicates the target instruction of the branch instruction is stored the 5th row in L1 instruction cache 112). Thus, processor core 116 directly fetches the instruction from the 5th row in L1 instruction cache 112 when the instruction is executed.

It is assumed that the target instruction address of certain branch instruction is "1654|14|3|5", and the instruction is executed. It indicates that the instruction is filled into L1 instruction cache 112. Further, it is assumed that the target instruction address of the branch instruction is stored in the 9th row in L1 instruction cache 112. The value "9" is written into the 3rd entry of the 14th row in the set 0 in the active list, and the valid bit of the entry is set to "1".

Therefore, when the read pointer of the tracker 114 points to the 7th entry of the 3rd row in the track table 110, the read out value "0|14|3|5" stored in the track point includes a BNX2. Based on the set number "0", the set 0 in the active list 104 may be found. Based on the index number and the block-offset, the 3rd entry of the 14th row in the active list may be found. At this time, the BNX1 stored in the entry is valid. Thus, based on the BNX1, processor core 116 directly fetches the instruction from the 9th row in L1 instruction cache 112. That is, processor core 116 does not need to fetch the instruction from the L2 instruction cache. At the same time, the value "9" of the BNX1 stored in the entry is written into the 7th entry of the 3rd row in the track table 110. That is, the 7th entry of the 3rd row in the track table 110 stores a value "915" containing the BNX1 information to complete the updating of the track table 110. Therefore, when the instruction is executed, processor core 116 directly fetches the instruction from the 9th row in L1 instruction cache 112.

When the read pointer of the tracker 114 points to the 11th entry of the 3rd row in the track table, the read out value "1|14|2|8" stored in the track point includes a BNX2, according to the previous described method, the BNX2 concatenates block-offset 306 as an active list address to search a BNX1 stored in the 2nd entry of the 14th row in the set 1 in the active list 104, the BNX1 is invalid. It indicates that the corresponding branch target instruction is not in L1 instruction cache 112. Therefore, the corresponding L1 instruction block stored in L2 instruction cache 106 is filled into the L1 instruction block pointed to by the value "38" of the BNX1 which is determined by a replacement policy (e.g., LRU) in L1 instruction cache 112. That is, the corresponding L1 instruction block stored in L2 instruction cache 106 is filled into the 38th row in L1 instruction cache 112. At the same time, the value "38" is written into the 2nd entry of the 14th row in the set 1 in the active list, and the valid bit of the 2nd entry of the 14th row in the set 1 in the active list 104 is set to "1". That is, a value "38|8" containing the BNX1 information is written into the 11th entry of the 3rd row in the track table 110 to complete the updating of the track table and the active list. The replacement policy such as FIFO, LRU, Radom or LFU may also be used.

As used herein, the entry of active list may also include additional P field for storing the Level 2 Way number in the Level 2 block number of sequential prior Level 2 instruction block, and the N field for storing the Level 2 Way number in the Level 2 block number of sequential succeeding Level 2 instruction block. Then when the scanner exams a branch instruction and found the branch target instruction is in the prior or succeeding Level 2 instruction block of the Level 2 instruction block of the branch instruction, it is possible to read out from active list the Way number of the corresponding prior or succeeding L2 instruction block based on the Level 2 block number of the block being examined. The corresponding Level 2 block number of the said prior or succeeding Level 2 block may be obtained through combining the said Way number read out with the Index of the block being examined decrement or increment by '1', thus avoiding an Active List matching operation on the said branch target instruction address.

As used herein, when scanner examines a Level 1 instruction block (called the Current L1 instruction block for short), if the Current Level 1 instruction block is the last Level 1 instruction block in a Level 2 instruction block (called the Current L2 instruction block for short), then establish the End track point of the Current L1 instruction block as described before. If the Level 2 instruction block (called succeeding L2 instruction block) which contains the said succeeding Level 1 instruction block of the Current instruction block is already in the Level 2 (L2) cache, then fill the L2 block number of the succeeding L2 instruction block as the track point content to the said End track point. If the said succeeding L2 instruction block is not yet in L2 cache, then fill the said succeeding L2 to a L2 cache position which is designated by the replacement logic, and fill the corresponding L2 block number as the track point content into the said End track point. Here the L2 block number of the sequential next L2 instruction block is the L2 block number of the said succeeding L2 instruction block. The way number of the said L2 block number may be filled in the field N of the active list entry pointed by L2 block number of the Current L2 instruction block (called Current L2 block number for short). The L2 instruction block number of the sequential previous L2 instruction block of the said succeeding L2 instruction block is the said Current L2 instruction block number, the way number in the said Current L2 instruction block may be filled as content into the P field of the active list entry pointed to by the L2 instruction block number of the said succeeding L2 instruction block.

The following operations may fill or update field P and N in the active list entries. When the said new L2 instruction block is filled into L2 cache, the tag of the said prior or succeeding L2 instruction block is the same as that of the Current instruction block, but the index value is off by '1'. So the index value may be obtained through the decrement or increment of the Current index value by '1'. Read out the contents of each of the ways in the active list corresponding to this new index value and match the tags in the contents with tag of the Current L2 instruction block. If there is a tag match in the ways of the set which has an index that is '1' less than the index of the Current L2 instruction block, the way number in the matched entry may be stored in the P field of the active list pointed to by the Current L2 instruction block number as the field content; and way number of the Current L2 instruction block be stored in N field of the matched entry as the field content. If there is a tag match in the ways of the set which has an index that is '1' more than the index of the Current L2 instruction block, the way number in the matched entry may be stored in the N field of the active list pointed to by the Current L2 instruction block number as the field content; and way number of the Current L2 instruction block be stored in P field of the matched entry as the field content.

Figure 5:
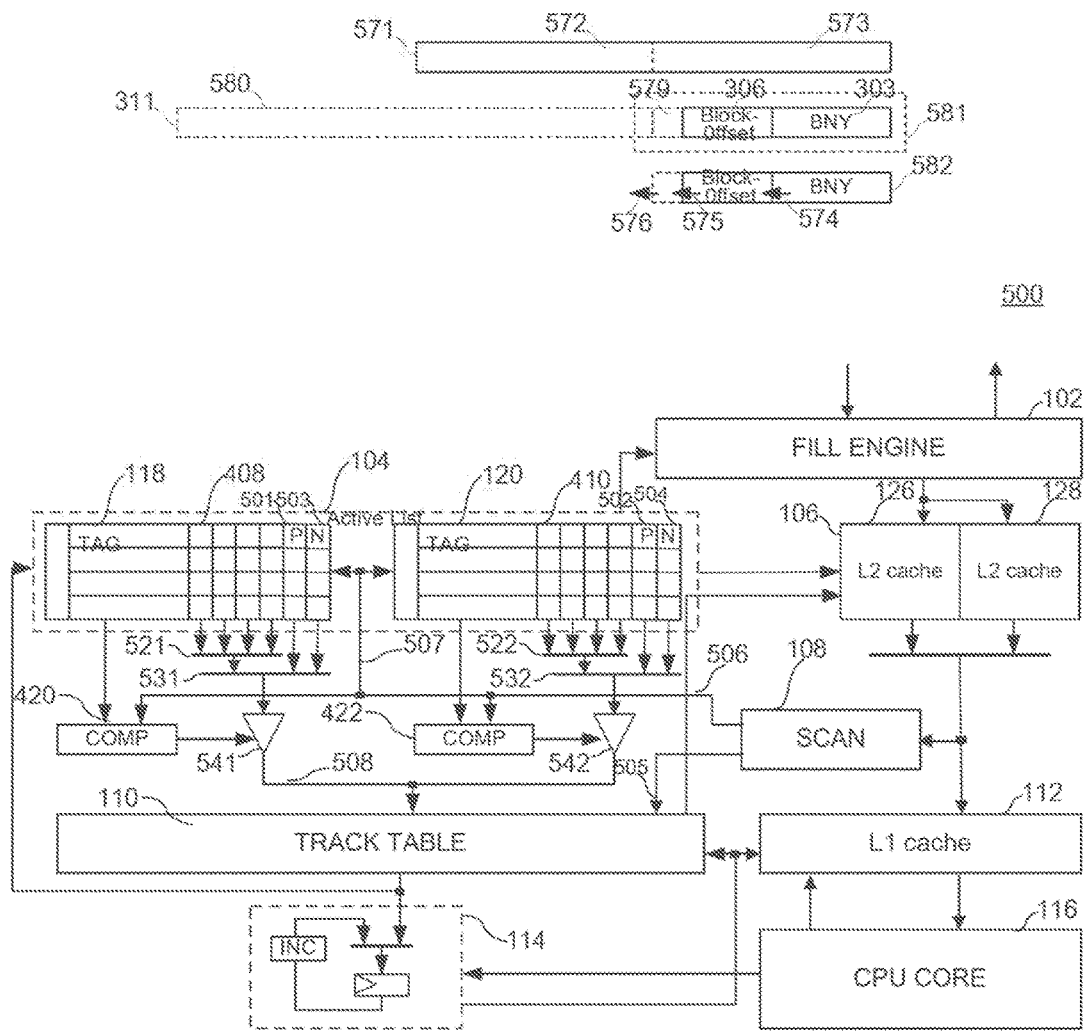
FIG. 5 illustrates another exemplary 2-way set associative two level cache system consistent with the disclosed embodiments.

FIG. 5 illustrates another exemplary cache system with 2-way set associative level 2 cache 500 consistent with the disclosed embodiments. In the embodiment, the target address 312 adopts a part of the full instruction address to illustrate. It is assumed that a L1 instruction block includes 4 instructions, thus the offset 303 of instruction line address 312 is the 2 bit BNY, which determines the position of an instruction position in a L1 instruction block. It is also assumed that the track table includes 128 lines, thus the L1 block number BN1X (BN1X is the same as the BNX1 described before) is 7 bits, which is the line number of the L1 instruction block. BN1X concatenated with BN1Y is called BN1, which indicates the position of an instruction in L1 cache. A L2 instruction block includes 4 L1 instruction blocks, thus the block-offset 306 is 2 bits. The block-offset 306 concatenated with the offset 303 is called BN2Y. It is also assumed that the active list has 1024 lines, thus the index 307 is 10 bits. The index 307 concatenating with the corresponding way number is called L2 block number BN2X. (BN2X is the same as the BNX2 described before.)

The structure of the embodiment is basically the same as that of the FIG. 4, the difference is every line of the active list 104 has additional entry for address of prior instruction block, additional entry for address of succeeding (next) instruction block, and there are multiplexers servicing these entries. Every line of the left array in active list 104 (it represents a L2 cache block), besides the existing entries 118 storing tags and the entries 408 storing the 4 L1 cache block address corresponding to the current L2 cache block in FIG. 4, there are also the entry 501 for storing the prior L2 cache block address and the entry 503 for storing the succeeding L2 cache block address. Accordingly, the output of entry 408 in the left array is still selected by selector 521, but the output of selector 521 and the output of additional entry 501 and 503 are selected by selector 531. Likewise, the right array adds entry 502 for storing prior L2 cache block address and entry 504 for storing succeeding L2 cache block address and selector 532 corresponding to selector 531.

Same as in FIG. 4, comparator 420 controls a tri-state gate in putting the output of selector 531 on the bus to be stored into track table 110; comparator 422 controls another tri-state gate in putting the output of selector 532 on the same bus to be stored into track table 110. The compare results of tag 118 and tag 120 with the instruction address respectively determine which output of the selectors (which way) will be stored in track table 110.

Because the cache is configured as way set associative in this embodiment, the index address of prior or succeeding L2 instruction block of the current L2 instruction block may be obtained by incrementing or decrementing the current L2 instruction index address (307 in FIG. 4) by '1', thus it is only necessary to store the way number of the prior L2 instruction blocks in the entries 501, 502, and store the way number of the succeeding L2 instruction block in the entries 503, 504. For ease of explanation, in the following embodiments, the term branch source instruction means direct branch instruction, unless specified otherwise.

Scanner 108 scans the L2 instruction sub-block when it is being filled from L2 instruction L2 cache 106 to L1 cache 112 based on LRU replacement policy. Scanner calculates the branch target address for the branch source instruction in the L2 instruction sub-block.

In order to reduce power dissipation, the number of accesses to active list 104 may be reduced through scanner 108 monitoring whether the branch target address exceeds the L1 instruction block boundary, the current L2 instruction block boundary, the prior instruction block boundary, or the succeeding L2 instruction block boundary.

In this embodiment, the branch offset is added to the lower bits of base address to determine whether branch target address exceeds the boundaries. As shown in FIG. 5, the branch offset 571 is added to the lower bits 581 of base address by an adder, and the carry signals 574, 575 and 576 on three boundaries of the adder are extracted and put through a priority processing logic, so a valid 'within the boundary' signal corresponding to a larger data block will disable the valid signal of a smaller data block.

As shown in FIG. 5, the lower bits 581 of base address are partitioned into 3 parts. The first part is the offset 303 of base address 311, the second part is the block-offset 306, and the third part 579 is one bit higher than block-offset 306. The branch offset is partitioned into two parts. The lower part 573 corresponds to the lower bits 581 of base address 311; the rest is higher bits 572. Likewise, the sum 582 is portioned into three parts; the boundaries are the same as partitioned in base address. Carry signals 574, 575 and 576 are generated at each boundary.

Take positive branch offset 571 as an example, the method for determining the address boundary condition is as follows:

1. if the higher bits 572 of the branch offset 571 are not all '0', the branch target address calculated by adder exceeds the succeeding L2 instruction block of the current L2 instruction block. This situation is called situation 1.

2. if the higher bits 572 of the branch offset 571 are all '0', and the carry signals 574, 575 and 576 are '0', it indicates the branch target address is within the L1 instruction block where the branch source instruction is located. This situation is called situation 2.

3. if the of higher bits 572 of the branch offset 571 are all '0', and the carry signal 574 is '1' and the carry signals 575 and 576 are '0', it indicates the branch target address is within the L2 instruction block where the branch source instruction is located. This situation is called situation 3.

4. if the higher bits 572 of the branch offset 571 are all '0', and the carry signal 575 is '1' and the carry signal 576 is '0', it indicates the branch target address is within the succeeding L2 instruction block to the L2 block where the branch source instruction is located. This situation is called situation 4.

5. if the higher bits 572 of the branch offset 571 are all '0', and the carry signal 576 is '1', it indicates the branch target address is located outside of the succeeding L2 instruction block to the L2 block where the branch source instruction is located. This situation is also called situation 1.

The afore method may be used to determine boundary conditions for negative branch offset 571. The differences are as follows: first determine whether the higher bits 572 of branch offset 571 are all '1'. If the higher bits 572 are not all '1', the boundary condition is situation 1 afore depicted. If the higher bits 572 are all '1', and the carry signals 574, 575 and 576 are all '0', the boundary condition is the situation 2 afore depicted. If the higher bits 572 are all '1', the carry signal 574 is '1', the carry signals 575 and 576 are '0', the boundary condition is the situation 3 afore depicted. If the higher bits 572 are all '1', and the carry signal 575 is '1', the carry signal 576 is '0', the boundary condition is the situation 4 afore depicted. If the higher bits 572 are all '1', and the carry signal 576 is '1', the boundary condition is the situation 1 afore depicted.

The number of active list accesses may be reduced based on the above. When scanner 108 scans an instruction segment using the BN1X of this instruction segment temporary stored in scanner and the PC address to calculate the branch target address, the positions of the branch target address are as follows.

When scanner 108 detects situation 1, the branch target instruction address calculated by scanner 108 is sent to active list 104 through bus 507, using the index within the address to read out the tags and match them with the tag within the branch target address. If a tag matches, the subsequent operation is the same as before. If the tags do not match, based on the calculated branch target address, the corresponding instruction block is fetched from the lower level memory and filled into a L2 cache block determined by replacement policy, the subsequent operation is the same as before.

When scanner 108 detects situation 2, the branch target address and the branch source address are located in the same L1 instruction block, that is the target instruction and the source instruction have the same BN1X. In this situation, shut off all the tri-state gates (such as tri-state 541), and concatenate the branch source BN1X stored in scanner with the calculated offset 582 (that is BN1Y) to obtain BN1, and send the BN1 though bus 505 to write in an entry of track table 110 which is pointed to by branch source's BN1X and BN1Y which are both temporarily stored in scanner 108. When the branch source is being executed, the processor 116 may directly fetch the instruction from L1 cache 112.

When scanner 108 detects situation 3, the branch target address and branch source address are located in the same L2 instruction block, that is the target instruction and the source instruction have the same BN2X. In this situation, use the BN2X of source instruction block (both the way number and the index portion) to read out a second memory block (such as 408 or 410) from the corresponding entry in active list 104 and then use the block-offset 575 to select the content of corresponding field within the second memory block. If the BN1X stored in this field is valid, the tri-state corresponding to the way number in branch source BN2X is turned on and the other tri-states are shut off, so the valid BN1X is sent though bus 508 to track table 110, and the calculated BN1Y is sent though bus 505 to track table 110. The BN1X is concatenated with the BN1Y to form a BN1 which is written in an entry of track table 110 pointed to by branch source's BN1X and BN1Y which are both temporarily stored in scanner 108. The BN1Y is obtained by pruning block offset 575 from the calculated branch target BN2Y. If the BN1X stored in the said field is invalid, all the tri-state gates are shut off, and then the branch source BN2X stored in the scanner 108 is concatenated with the calculated branch target BN2Y as BN2, and the BN2 is sent though bus 505 to be written into an entry of track table 110 pointed to by branch source's BN1X and BN1Y temporarily stored in scanner 108. The subsequent operation is the same as before.

When scanner 108 detects situation 4, the branch target address is located in the prior or the succeeding L2 instruction block of the branch source address, that is, the difference between the index of branch target instruction and the index of branch source instruction is '±1'. In this situation, use the BN2X (including both the way number and the index) of branch source instruction to read out the third storage block (such as the third storage block 501, 502 or 503, 504) of the corresponding entry in active list 104. Based on the said boundary situation, when the branch target address is located in the prior L2 instruction block of the branch source, then select the corresponding storage field P (such as the third memory block 501 or 502); when the branch target address is located in the succeeding L2 instruction block of the branch source, then select the corresponding storage field N (such as the third storage block 503 or 504). If the selected way set number stored in the storage field is valid, then the corresponding tri-state gate is turned on and the other tri-state gates are shut off, the BN2X is sent through bus 508 to track table 110. At the same time, the scanner 108 performs a decrement or increment operation on the branch source index stored in scanner 108 to obtain a new index which is sent together with the calculated BN2 through bus 505 to track table 110. The BN2X and BN2Y are concatenated to become BN2, which is written in an entry of track table 110 pointed to by branch source's BN1X and BN1Y which are both temporarily stored in scanner 108. If the way number of the selected field is invalid, the branch target address calculated by scanner 108 is sent through bus 506 to active list 104 for indexing and matching. The subsequent operation is the same as situation 1 before.

Using the method described above, it reduces the access frequency of active list 104. However, in situation 2 and situation 3, it needs additional way numbers and the index 307 to look up entries 408 and 410 in active list 104 to obtain the first instruction address of the same L2 instruction block, or to obtain the next second address in entries 501, 502, or to obtain the previous second address in entries 503, 504. If the scanner 118 scans the instruction block filled into higher level cache 112 from lower level cache 126 or 128, the entries in the active list 104 corresponding to this instruction block are filled into scanner 108, which can further reduce the access frequency of active list 104. Besides, if the temporary storage device in scanner 108 has multiple independent read ports, according to boundary check situation of the branch target instruction address, the plurality of branch instructions in the scanning instruction segment can access the distributed read port to map the branch target address with the format BN1 or BN2, and it can be easily stored into track table 110.

Figure 6:
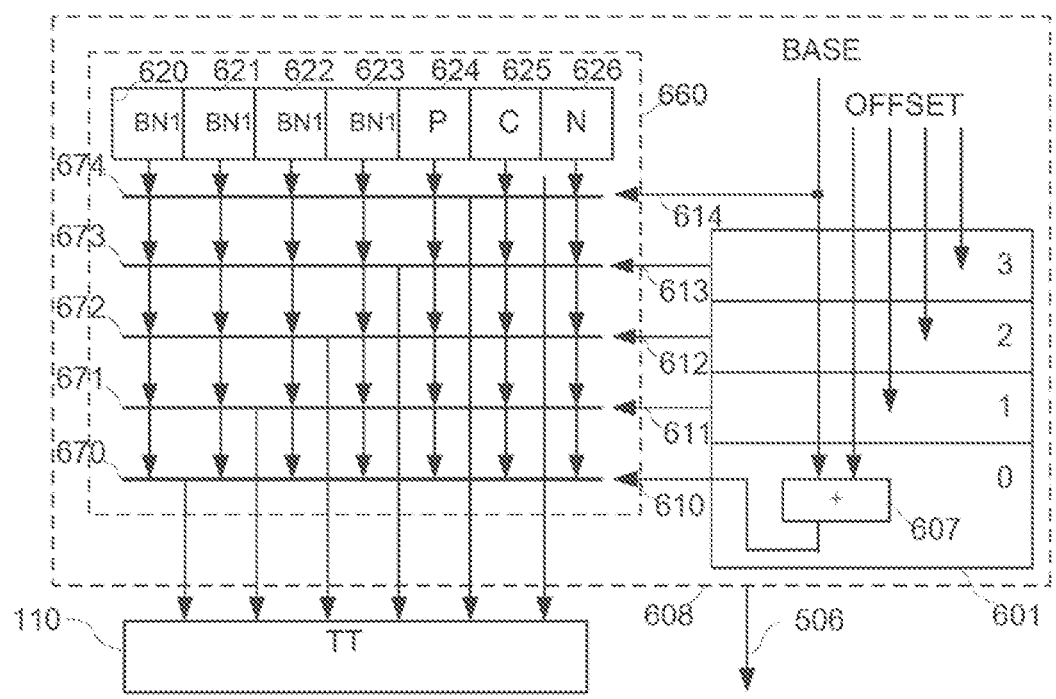
FIG. 6 illustrates another exemplary the Scanner in two level cache system consistent with the disclosed embodiments.

FIG. 6 illustrates another exemplary Scanner in two level cache system 600 consistent with the disclosed embodiments. In this embodiment, an instruction block of higher-level cache 112 contains 4 instructions, i.e. the offset 303 BNY is 2 bits. An instruction block of lower-level cache 126 or 128 contains 4 higher-level instruction blocks, i.e. the block-offset 306 is 2 bits. Each line in track table 104 corresponds to a lower-level instruction block. Each line contains 4 entries to store BN1X. As in memory block 408, it also contains an entry to store the way set number of previous instruction blocks in lower-level cache as in entry 501, it further includes an entry to store the way set number of next instruction block in lower-level cache as in entry 503. These 4 instructions in lower-level cache 112 are filled into a higher-level cache 126 or 128 in one operation. The scanner 108 includes a decoder and determination module 601; it contains 4 instruction decoders and determination sub blocks. Each sub block includes an instruction decoder and an adder, 607 for example. The scanner 108 also contains a micro active block 660. The scanner 608 can replace the scanner 108 in FIG. 5; the other parts of the structure are the same as FIG. 5, only track table 110 is illustrated in FIG. 6.

When an instruction block of lower-level cache is filled into scanner 608, the corresponding active list line is read out from active list (104) at the same time. The way number of this line, the index number 307 and the block-offset 306 are sent to scanner 108 for temporary storage. Herein, the tag entry 118 of active list line stored in scanner 108 and the said memory 306 are not shown in FIG. 6. The micro active list block 660 of scanner 108 contains 4 storage entries (620, 621, 622, and 623) to store 4 BN1Xs separately such as the entry 408 in active list 104. The micro active list block 660 also contains 3 entries (624, 625 and 626), herein, the entry 624 is used to store the way number of previous instruction blocks in lower-level cache as in entry 501, the entry 625 is used to store the way number and index address of the current lower-level cache block, and the entry 626 is used to store the way number of next instruction block in lower-level cache as in entry 503. The content of entry 625 is the way number and index address 307 of the scanning L2 instruction block; it is filled into the scanner 608 at the same time.

The micro active list block also contains 5 selectors (670, 671, 672, 673, and 674); herein the selectors (670, 671, 672, and 673) have the same structure. Based on the decoding of the corresponding decoders and boundary conditions determination by the determination sub-block, selects one of the entries (620-626) to provide the BN1X or BN2X address either directly or after certain operation. The BN1X or BN2X is concatenated with the address offset 303 calculated by adder, such as 607, to be written into the track table entry corresponding to the instruction being scanned. The $5^{th}$ selector 674 selects the content in entry (620-626), and then fills the content into the end track point. The control logic of selector 674 is different from the selectors (670-673).

The sub block of the decoder and determination module 601 corresponding to one of 4 instructions in one block, the decoder in sub-block performs decode operation, if the instruction is not a branch instruction, the instruction type is written into the corresponding entry in track table and the scanner does not calculate the branch target address. If the instruction is a branch instruction, the sub-block generates a result of boundary determination according to the method described above, and then using the result to select the branch target address, and concatenate with the instruction type to write into the entry of track table 110 corresponding to the branch source instruction. The following example shows a situation that the instruction is a branch instruction.

For ease of understanding, branch offset is a positive number in following example. The case in which the branch offset is a negative number can be deduced from this situation. As the boundary location is described in the above embodiments, if determination result belongs to situation 1, the branch offset adds the base PC of the source instruction.

The base PC is the tag concatenated with index, block-offset 306 and the offset 303 BNY, which are stored in scanner temporarily. The first three parts of the base PC of 4 instructions in an instruction block are the same, the BNY are different. According to the sequence, the BNY of the first instruction is '0', the BNY of the following 3 instructions are sequentially '1', '2', '3'. The sum generated by adder is the branch target address. Using the index part of the address to read out a line of active list 104. Use the block-offset 306 of the address to select a BN1X stored in one of the 4 entries in the same line, and then send to tri-state 541 though selector 531. Compare the tag 118 in the line with the tag part 311 of the branch target address in comparator 420, if the result is matched, the result can enable the tri-state gate 541, and output of tri-state 541 concatenates with the BNY 303 of the branch target address, and the result is written into the entry pointed to by the corresponding to the instruction being scanned. If the tag entry 120 of the right array is equal to the tag part 311 of the branch target address, the BN1X sent to track table comes from the entry 410. The principle is the same as above, which is not repeated herein. The following example illustrates the branch offset is '0'.

Each decode and determination sub-unit sums its own block-offset 306, offset 303 to its own branch offset 571 in its own branch instruction in an adder, such as 607. According to the said method above, each sub-block unit judges the target address boundary and using the determination signal selects the corresponding content of the memory entries (620-625) to fill into track table. Take the sequential first instruction of the scanning instruction block for example, the block-offset 306 concatenates with offset 303 (the offset 303 of sequential first instruction is '0') to sum with the branch offset 571 of the branch instruction in adder 607. The detailed process can refer to the above embodiments, which is not repeated herein.

If the address boundary is in situation 2 or situation 3, use the offset 306 of the sum generated by adder 607 to control selector 670. Such as the block-offset 306 is '00', the selector 670 select the content of entry 620, if this entry is valid, send the BN1X stored in this entry to the first entry of track table. If the entry is invalid, the selector 670 selects the way number stored in entry 625. The output way set number concatenates with the index 307, block-offset 306 and BNY 303 are filled into the first entry of track table. The track corresponds to the scanning L1 instruction block. If the block-offset 306 of the branch target address is '01', or '10', or '11', the detailed process can refer to the above embodiments, which is not repeated herein.

If the address boundary is in situation 4, and the branch target instruction is located in the previous L2 instruction block, the selector 670 selects the way number stored in the entry 624 and selects the index 307 stored in the entry 625. The index 307 minus '1' concatenates the way set number stored in 624, the block-offset 306, and the offset 303 as a BN2 address. Then fill this BN2 address into the first entry of track table. If the branch target instruction is located at the next L2 instruction block, the selector 670 selects the way number stored in the entry 626 and selects the index 307 stored in the entry 625. The index 307 adds '1' concatenates the way number stored in 624, the block-offset 306 and the offset 303 as a BN2 address. Then fill this BN2 address into the first entry of track table.

The other 3 instructions in the instruction block also abide by the method describe above to judge the address boundary. According to the determination signal, control selectors (671, 672 and 673), and then each fill the selected output into the second, third and fourth entries.

The end entry in track table, i.e. the ending track point, is filled by the output of the selector 674. The selector is controlled by the block-offset 306 of the base PC of the instruction. If the block-offset 306 is '00', the selector 674 selects the entry 621. If the entry 621 is valid, the selector 674 outputs the content stored in the entry 621. If the entry 621 is invalid, the selector 674 selects the way number and index 307 stored in the entry 625. The output of the selector 674 concatenates with block-offset 306 within the sum generated by the adder 607 but incremented by '1', and concatenates with offset 303 (BNY); the concatenation result is stored into the End entry in track table. If the block-offset is '01' or '10', the detailed process can refer to the above description, which is not repeated herein. If the block-offset is '11', selector 674 selects the way number stored in the entry 626 and the index stored in then entry 625. The succeeding L2 block way number in entry 626 concatenates with the index 307 in entry 625 incremented by '1', and concatenates with and the block-offset 306 generate by adder 607, and concatenates with offset 303, the concatenation result forms a BN2X which is stored into the ending entry in track table.

In the embodiment, the active list 104 can also adopt multiple read-write port memories. It can realize multiple branch target addresses simultaneously accessing the active list.

Figure 7A:
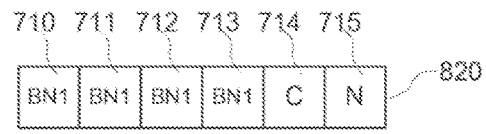
FIG. 7A illustrates an exemplary memory structure of a fully associative micro track block consistent with the disclosed embodiments.

FIG. 7 illustrates an exemplary memory and format in fully associative micro track table consistent with the disclosed embodiments. In FIG. 7A, this is a memory 820 structure of a fully associative micro-track block. Memory 820 includes 6 entries, and it corresponds to a L2 instruction block, which includes 4 L1 instruction blocks. Therein, the entry 710 stores a BN1X and valid signal of L1 instruction block, which corresponds to the L2 instruction block with block offset '00'. The entries 711, 712, 713 store L1 instruction blocks with '01', '10', '11' as its block offsets respectively. The entry 714 stores the way number and index 307 of the current L2 instruction block, the entry 715 stores the way number of the next L2 instruction block.

Figure 7B:
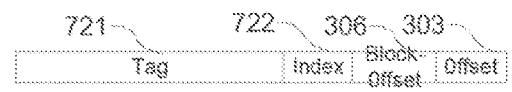
FIG. 7B illustrates a branch target address being partitioned into parts consistent with the disclosed embodiments.
Figure 8:
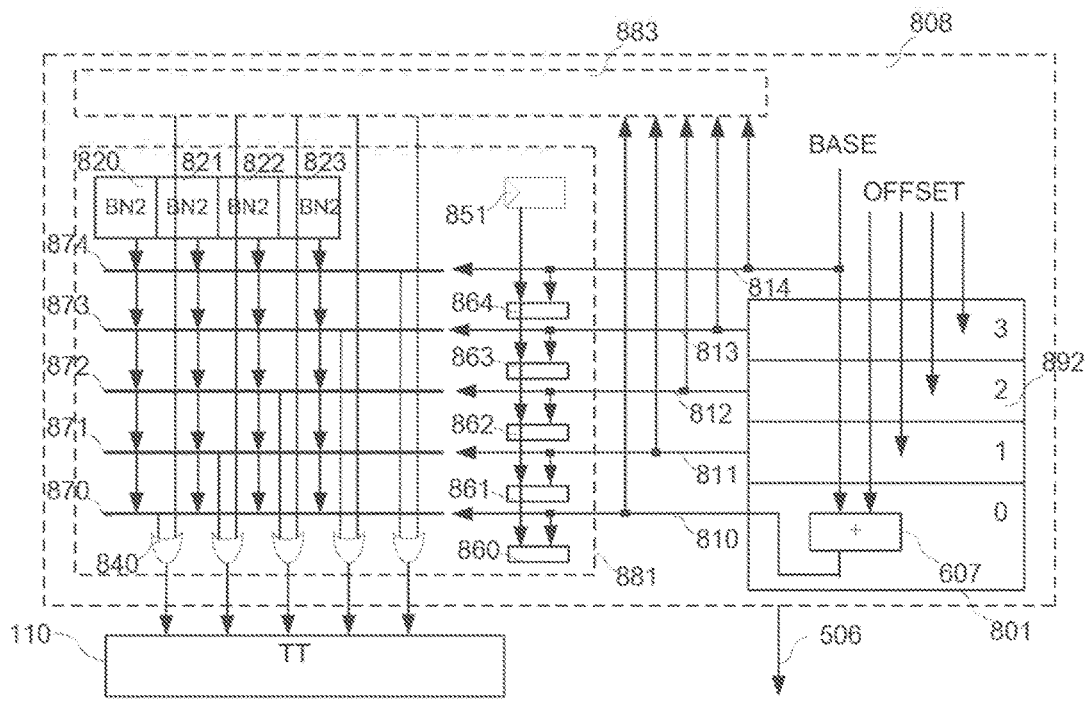
FIG. 8 illustrates an exemplary a fully associative micro track table consistent with the disclosed embodiments.

FIG. 8 illustrates an exemplary fully associative micro track table consistent with the disclosed embodiments. Therein, module 110 is the track table, module 808 is the scanner, and it can replace the scanner 108 in FIG. 5. The functional module 801 is similar to the decoder and determination module 601 in FIG. 6. It is used to decode and calculate the branch target address for a plurality of instructions in a L1 instruction block. This functional module 801 decodes each instruction and judges its instruction type, and then calculates the target instruction address of the branch instruction by adding the base address of the source instruction and the offset of the branch instruction, finally using this target address to select the content of the micro active list 881. In FIG. 7B, these branch target address can be partitioned into 4 parts, i.e. the Micro Tag 721, Micro Index 722, Block-offset 306, and offset 303 arranged in descending order from higher bit to lower. The Micro Tag 721 and Micro Index 722 are different from the tag 311 and index 307 in the above embodiments. Therein, the Micro Index 722 only has 2 bits, because each micro active list only contains 4 lines corresponding to a L2 instruction block. Because a L2 instruction block includes 4 L1 instruction blocks, the Micro Index 722 is the lowest 2 bits of the index 307 of active list. Therefore, the other bits in the active list index 307 are merged into Micro Tag 721. The address is the same and the difference is the tag and index partitioned at different locations. The Micro Tag 721 consists of tag 311 and bits in active list 307 except for the lowest two bits.

The first 3 parts (721, 722 and 306) are sent to each micro active block (such as micro active list block 881, 883) though buses (810, 811, 812, and 813). The offset 303 concatenates with the output BNX of corresponding selector as a BN address to fill into the entry of track table 110. Back to FIG. 8, the micro active block 881 contains memories (820, 821, 822, 823), which are used to store the entry of track table, it also contains selector (870-874). Herein, the structure of memories such as 820 is illustrated in FIG. 7A.

The micro active block 881 contains a micro tag register 851, herein it stores the base address of a consecutive instruction corresponding to an entry of active list stored in micro active block 881. The micro active block 881 also contains 4 comparators (860, 861, 862 and 863). One input of each comparator couples with the output of the register 851, another output couples with one of the said four-branch target addresses (810, 811, 812, 813) separately. The branch target addresses (810, 811, 812, 813) are sent to micro active block (881, 883), and compared with the micro tag stored in the micro active block. In micro active block 881, it assumes the tag 721 of target address 810 is equal to the micro tag stored in the micro register 851. The comparator 860 controls multiplexer 870 using micro index 307 in the branch target address and block-offset 306. The micro index 307 selects one of the four memories, if the micro index is '00', it selects register 820, if the micro index is '01', '10', '11', it selects memory (821, 822, 823) respectively. The block offset 306 selects one group of BN1X and valid bit from the selected memory. If the valid bit is valid, selector 870 outputs the BN1X address of the selected group; if the valid bit is invalid, selector 870 outputs the way number and index 307 stored in the entry 714 of the memory 820, and together with the block-offset 306 of branch target address. The OR gate 840 performs logic OR operation on this output and the same output node from micro active block 883, and the result is concatenated with the offset 303 from adder 607's output. The sum is written to the first entry in track pointed by address bus 505 in track table 110.

In micro active block 881, it assumes the tag 721 of target address 811 is not equal to the micro tag stored in micro register 851. At the same time, the comparator 861 sends a control signal to multiplexer 871, and the output of multiplexer 871 is '0', thus this result cannot affect the corresponding outputs of the other active blocks. If the tag 721 of target address 811 doesn't match any of the micro tags stored in micro active block, then it sends the branch target 811 to active list 104 to read out the entry of active list 104 pointed to by the branch target 811, and then fills the content into the second entry of a track line pointed to by address bus 505 in track table 110. With the same theory, the remaining 2 branch target instruction addresses 812, 813 control the multiplexers 872, 873 separately and select one of 16 BN1, select the way number and index 307 concatenated with offset 306 of the target instruction, or outputs '0'. The outputs of the selectors concatenate with the corresponding BN1Y, and then perform OR operation with the result from micro active block 883, send the OR result to the third or the fourth entry of track table 110. If the instruction is not a branch instruction, the decoder disables corresponding comparator, such as the instruction 892 is not a branch instruction, the valid bit of branch target address 812 is invalid, the comparator 862 in micro active block (881, 883) doesn't compare the target address with the micro tag. The no-branch type is written into the third entry of track table 110.

Figure 7C:
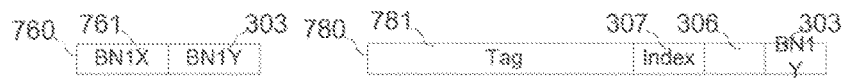
FIG. 7C illustrates an address type in a track table.

Using a similar method, the next block address can be written into the ending point of the corresponding track. There are some differences between the connect mode to memory 820 of register selector 874 and selector (870-873). Under the same address control, the selector 874 selects the input of the next address of selector (870-873). It assumes that, the micro index 722 and block-offset 306 are '0000', the selectors (870-873) select the entry 710 of the memory 820; however, the selector 874 selects the entry 711 of the memory 820 according to the same address. If the micro index 722 and block-offset 306 are '0011', the selectors (870-873) select the entry 713 of the memory 820; however, the selector 874 selects the entry 710 of the memory 820. If the micro index 722 and block-offset 306 are '1111', which is a special case, the selectors (870-873) select the entry 713 of the memory 823, but the selector 874 selects the way number of the entry 715 and the sum of L2 block number of entry 714 and '1', which is concatenated with the block-offset 306 and then regarded as the next block address. The micro tag 721 of the current scanning base address is sent to each micro active block to compare with the micro tags stored in the memory. It assumes that the micro tag of the current address 814 is the same as the micro tag stored in register 851. The index 722 and the block-offset 306 control the selector 874. It outputs the entry if the selected BN1X is valid; or otherwise the selector 874 selects the way number and index 307 stored in the entry 724 of the memory 823 and then concatenates with the block-offset 306 of address 814 as the output. If the demanded next block address does not exist in each micro active block but does exist in the active list 110, it is filled into the ending point according to the similar method. Thus, an entire track can be filled in abiding by this method. FIG. 7C illustrates the address type in a track table. The address format 760 denotes format of L1 cache address and consists of BN1X 761 and offset BNY 303, whereas the address format 780 denotes format of L2 cache address and consists of way number 781, index 307, block-offset 306 and offset BNY 303.

Back to FIG. 8, if the micro tag of branch target 810, 811, 812, 813 and the current block 814 don't match the micro tag stored in each micro active block (such as micro active block 881, 882) of scanner 880. As used herein, the branch target address 811 is sent to active list 104 to read out its content and then filled into track table 110, the line in active list pointed to by the branch target address 811 can be filled into the memory of a micro active block (such as 883) pointed to by the micro index in the branch target address 811. The replaced micro active block is assigned by the replacement logic (such as LRU). If the micro index is '10', it replaces the content stored in the memory 822 of the micro active block 883. The BN1X and its valid bit of a line in the active list 104 pointed to by branch target address 811 are filled into the entries (710, 711, 712, 713) in sequence. The way number concatenates with the index 306 as a L2 cache block number filled into the entry 714. The way number of the next entry in active list (such as the entry 503) is filled into the entry 715. The micro tag of branch target address 811 is filled into the register 851 of the micro active block 883. Finally, the valid bits of memories (820, 821, and 823) are set to invalid. After this, it can update the memories (820, 821, and 823) in the cycle when there is no access to active list.

The replacement logic assigns a micro active block as replacement candidate according to specific algorithm. Take the LRU for example, each micro active block contains a counter with multiple bits; its lowest bit is at the rightmost side. When any one of the comparators is matched, the counter shifts left and the lowest bit is filled '1'. If the lowest bit of one counter is '0', the micro active block where the counter is located is the replace candidate. If the lowest bit of all counters are not '0', all counters shift left until the lowest bit of one of the counters is '0', thus the micro active block where the counter is located is the replace object.

In the disclosed embodiments, the instructions in one instruction block which is being scanned by scanner 108 could conduct address mapping in parallel by organizing active list blocks with set associative structure. The set associative micro active block resembles a reduced active list 104. For example, the number of columns and entries are the same but the row is 8 and it has 4 read ports which correspond to 4 instructions in an instruction block. Each read port corresponds to an entry of track table 110. Furthermore, there are 4 sets of selectors (521, 531), comparator 420, and tri-state 541 in FIG. 5. The four branch target addresses of four instructions are used to addressing for the set associative micro active block. Herein, the four micro indices are used for reading out 8 lines from two arrays of these two ways. The block offset 306 of 4 branch target addresses each select one group from the 8 BN1X address. The eight micro tags are compared with four branch micro tag in eight comparators. The way with the matched result drives its triple state gate and reads out the BN1X selected by 306, and writes it into the track table corresponding to this read port. Each of these 4 read ports writes one entry in track table.

A correlation table may be established to indicate the correlative relationship between tracks in track table 110, such as branching among different rows. The track without a branch target is selected and replaced in the track table 110. Or when one track in track table 110 needs to be replaced, the content (i.e., the branch target track address) of the corresponding branch source is updated, preventing errors (e.g. the content of the track point of the corresponding branch source points to the track point of the wrong branch target) from happening.

Without loss of generality, the structure of L1 instruction cache can be regarded as a storage table, while the structure of track table can be regarded as an index table. Thus, the storage table contains instruction blocks, which are indexed by the tracks in the index table. Once an instruction block is replaced, the contents of the corresponding entries should be modified to avoid the errors mentioned above. To effectively replace information stored in the memory, a storage table replacement method is implemented by using an index table, a storage table, and a correlation table. The storage table includes multiple storage cells, where every row of storage cells stores one row of information. An index cell in the index table stores a track address of the storage cell in the storage table. The track address includes a row address and a column address. The correlation table and the storage table have the same number of rows, where every row in the correlation table records the number of index rows that use the row as an index target in the index table and addresses of a certain number of index rows.

When a row of new information (i.e.: instruction block) needs to be stored/recorded, based on the record in the correlation table, a row in the storage table is selected and replaced with the new information.

Figure 9:
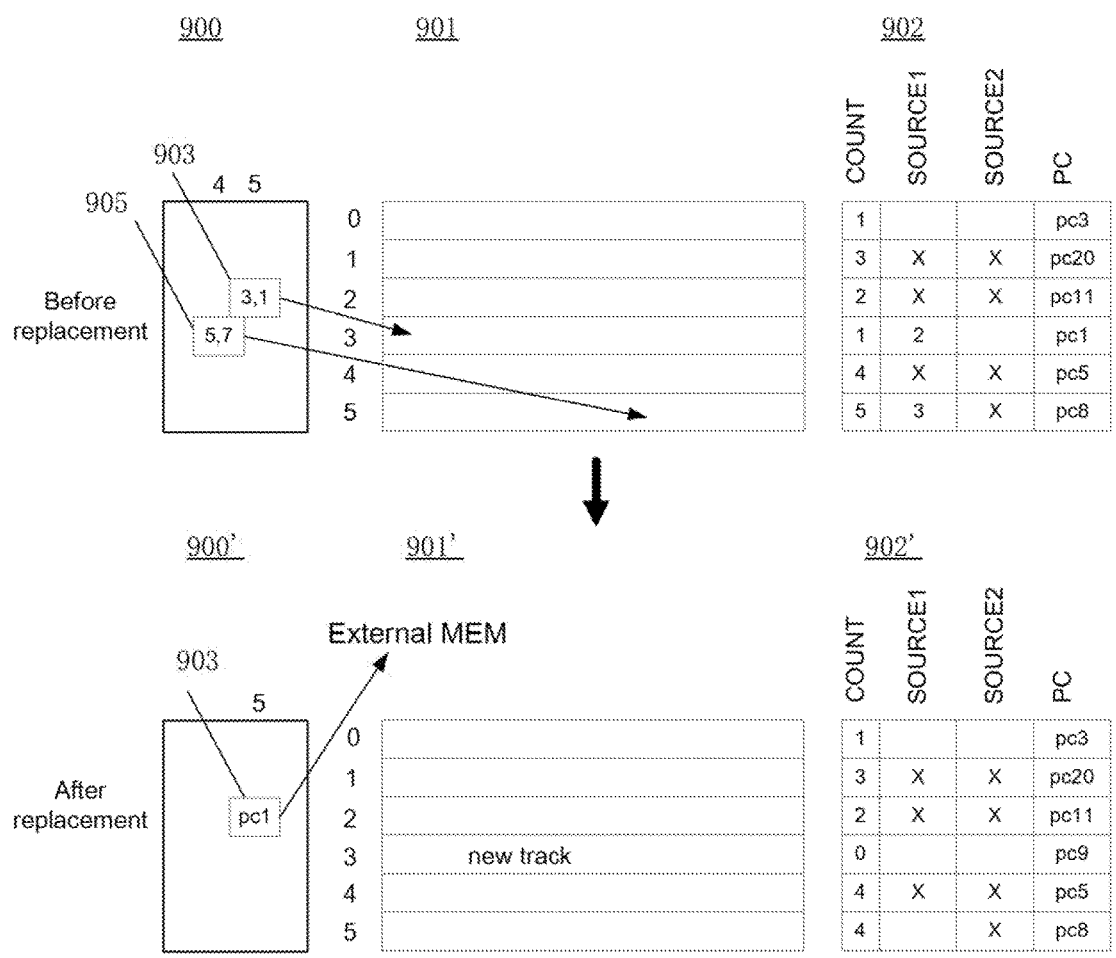
FIG. 9 illustrates a schematic diagram of an exemplary implementation for storage table replacement method consistent with the disclosed embodiments.

FIG. 9 illustrates a schematic diagram of an exemplary implementation for storage table replacement method consistent with the disclosed embodiments. As shown in FIG. 9, an index table 900, a storage table 901 and a correlation table 902 are used to implement the storage table replacement method. The index table 900, a storage table 901 and a correlation table 902 illustrate a storage state before the storage table replacement; and an index table 900', a storage table 901' and a correlation table 902' illustrate a storage state after the storage table replacement.

The storage table 901 illustrates only 6 rows of storage cells, where the row address of each row in the storage table 901 is row address 0, row address 1, row address 2, row address 3, row address 4 and row address 5, respectively. That is, each row of storage cell is given a row address that is different from row addresses of other rows of storage cells in the storage table 901 at the same time. For illustration purposes, rows with row address 0, row address 1, row address 2, row address 3, row address 4 and row address 5 in the storage table 901 are called the 0th row, the 1st row, the 2nd row, the 3rd row, the 4th row, and the 5th row, respectively. The number of storage cells per row is not shown in FIG. 9, which can be one or more cells per row. There is no limitation for the number of storage cells in each row.

The correlation table 902 and the storage table 901 have the same number of rows. The correlation table 902 illustrates only 6 rows of storage cells, where row address of each row in the correlation table 902 and row address of each row in the storage table 901 are the same, i.e., having a one-to-one correspondence. That is, row addresses of rows in the correlation table 902 are row address 0, row address 1, row address 2, row address 3, row address 4 and row address 5, respectively. Similarly, for illustration purposes, rows with row address 0, row address 1, row address 2, row address 3, row address 4 and row address 5 in the correlation table 902 are called the 0th row, the 1st row, the 2nd row, the 3rd row, the 4th row, and the 5th row, respectively. Specifically, every row in the correlation table 902 records the number of index rows that use the particular row in the storage table 901 (that is, the row in the storage table 901 corresponds to the row in the correlation table 902, or the row whose row address in the storage table 901 is the same as the row address of the row in the correlation table 902) as an index target in the index table 900 and addresses of a certain number of index rows. A column of storage cells with a "COUNT" tag in the correlation table 902 (that is, every row in the correlation table 902 has a storage cell with "COUNT" tag) is used to store the total number of index rows using the particular row. Every row in the correlation table 902 has two columns that are used to record the row address of the index row (that is, every row in the correlation table 902 has two storage cells that are used to store/record the row address of the index row), which are labeled respectively by "SOURCE1" and "SOURCE2" tag. In other embodiments of this disclosure, the correlation table 902 can also use less or more columns to record a row address of an index row. For example, the correlation table 902 can use one column to record a row address of an index row. Or the correlation table 902 can also use three columns and four columns to record the row address of the index row.

When a row of new information needs to be stored/recorded, based on the record in the correlation table 902, a row in the storage table 901 is selected and replaced. For example, if the number of index rows recorded in the 0th row in the correlation table 902 is 0, the 0th row is selected and replaced. That is, information in the first row ('0') of the storage table 901 is replaced by new information. In other words, if a row in the correlation table 902 has 0 number of index rows, the row can be selected and replaced.

If the number of index rows recorded in every row in the correlation table 902 is not equal to 0, a row (in the storage table 901) which corresponds to a row with the number of index rows recorded not equal to 0 but equal to the number of valid index row addresses recorded in the correlation table 902 (that is, "COUNT" value equals to the number of "SOURCE1", and "SOURCE2" that stores index row addresses) is selected and replaced. As shown in FIG. 9, for illustration purposes, "x" in the columns corresponding to "SOURCE1", "SOURCE2" indicates that a valid index row address is recorded; blank indicates that corresponding "SOURCE1" and "SOURCE2" do not store a valid index row address.

In FIG. 9, the number of index rows recorded in the 0th row in the correlation table 902 is 1 but the index row address is not recorded in the 0th row; the number of index rows recorded in the 1st row is 3 and the 1st row records all index row addresses; the number of index rows recorded in the 2nd row is 2 and the 2nd row records all index row addresses; the number of index rows recorded in the 3rd row is 1 and the 3rd row records the corresponding index row address; the number of index rows recorded in the 4th row is 4 and the 4th row records all index row addresses; and the number of index rows recorded in the 5th row is 5. At this time, the number of index rows recorded in every row in the correlation table 902 is not equal to 0.

The contents of index cell 903 at the 2nd row and the 5th column of the index table 900 point to the 3rd row in the storage table 901. The number of index rows recorded in the 3rd row in the correlation table is 1, therefore only one index row (that is, the index row 2) points to the 3rd row in the storage table 901. Specifically, the index row points to the 3nd row and the 1st column of in the storage table 901. That is, the index row points to (3, 1) in the storage table 901. Therefore, the 3rd row in the correlation table 902 records the number of index rows "COUNT" as 1, row address "SOURCE1" of the index row as 2 (that is, the 2nd row or the 2nd index row in the index table 900).

At this time, when a row of new information needs to be stored/recorded, the 3rd row in the storage table 901 can be selected and replaced. Base on index row 2 recorded in "SOURCE1" of the 3rd row in the correlation table 902, an index cell that uses the 3rd row in the storage table 901 as an index target is searched in the 2nd row of the index table, and contents of the index cell (that is, the track address stored in the index cell) are updated. The track address of the track point corresponds to the instruction address of the instruction represented by the track point, thus reducing the risk of wrong pointing.

In contrast, although the number of index rows recorded in the 0th row in the correlation table 902 is also 1, because the 0th row does not record the row address of the corresponding index row, the 0th row in the storage table 901 cannot be selected and replaced.

Specifically, the correlation table 902 further includes a column with a "PC" tag. The column with the "PC" tag records an address tag of the corresponding row in the storage table 901. That is, every row in the correlation table 902 also records the address tag of the corresponding row in the storage table 901. The address tag refers to a tag that labels the corresponding row in the storage table 901. For example, an address that information stored in the rows in the storage table 901 locates at the other storage tables can be used as the address tag corresponding to the row. Thus, if information in the row in the storage table 901 is replaced, based on the address tag, the corresponding information can be found in other storage table, thus ensuring the index cell points to the right address.

In the storage table 901, an address of the 0th row is labeled as pc3; an address of the 1st row is labeled as pc20; an address of the 2nd row is labeled as pc11; an address of the 3rd row is labeled as pc1; an address of the 4th row is labeled as pc5; and an address of the 5th row is labeled as pc8. The address tag may be set based on needs, and there is no limitation for setting the address tag. The address tag only needs to label the address in the other storage table corresponding to the row in storage table 901.

The operations for replacing the row pointed to by the row address 3 in storage table 901 can further include the followings: when/after the 3rd row in the storage table 901 is replaced with new information (that is, when the storage table 901 is changed to a storage table 901'), based on row address 2 stored in "SOURCE1" in the correlation table 902, the 2nd row in the index table 900 is found. Then, a searching operation is performed on the 2nd row in the index table 900 and it is found that the track address stored in the 5th index cell points to the 3rd row in the storage table 901. Further, based on the address tag pc1 stored in the 3rd row in the correlation table 902, a track address (3, 1) stored in the 5th index cell of the 2nd row in the index table is changed to pc1, thus preventing the risk of the track address pointing to the wrong address.

When the 3rd row in the storage table 901 is replaced, the corresponding row in index table 900 also needs to be checked (that is, the 3rd row). Before the replacement, index cell 905 in the 3rd row and 4th column in the index table 900 stores track address (5, 7). That is, the index cell 905 points to a storage cell in the 5th row and 7th column in the storage table. Because the 3rd row in the storage table 901 is replaced, "COUNT" of the corresponding row (i.e. the 5th row) in the correlation table 902 is decreased by one. At the same time, "SOURCE1" that records the corresponding index row address (i.e., "3") is found in the row, and the value in the "SOURCE1" is cleared. That is, "COUNT" of the 5th row in the correlation table 902 is changed to 4, and the value in the "SOURCE1" is set to blank.

After the above replacement, the index table 900 is changed to an index table 900'. That is, the track address (3, 1) stored in the index cell of 2nd row and 5th column in the index table is changed to pc1. The storage table 901 is changed to a storage table 901'. That is, the information stored in the 3rd row in the storage table is replaced and changed to new information (i.e., a new track). The correlation table 902 is changed to a correlation table 902'. That is, the contents stored in the 3rd row in the correlation table 902 are updated according to the updated information in the storage table 901'. At this time, it can be seen that the row pointed to by row address 3 in the storage table 901' does not have the storage cell pointing because "COUNT" of row address 3 in the correlation table 902' is 0. Then, based on the updated contents in the index table, the corresponding "COUNT" value in correlation table 902' is updated. For example, when only 1 index row contains an index cell that points to the 3rd row in the storage table because of the updated contents of the index cell in the index table, "COUNT" of the row address 3 in the correlation table 902' is changed to 1.

As can be seen from the above embodiments, the index cell in the index table 900 stores a track address of the storage cell in storage table 901. The track address includes a row address and a column address. The correlation table 902 and the storage table have the same number of rows, where every row in the correlation table 902 records the number of index rows and row addresses of a certain number of index rows when the row is used as an index target in the index table 900. Thus, when a row of new information needs to be stored/recorded, based on a record in the correlation table 902, a row in the storage table is selected and replaced, easily replacing information in the storage table 901 and improving use efficient of the storage table 901.

Figure 10:
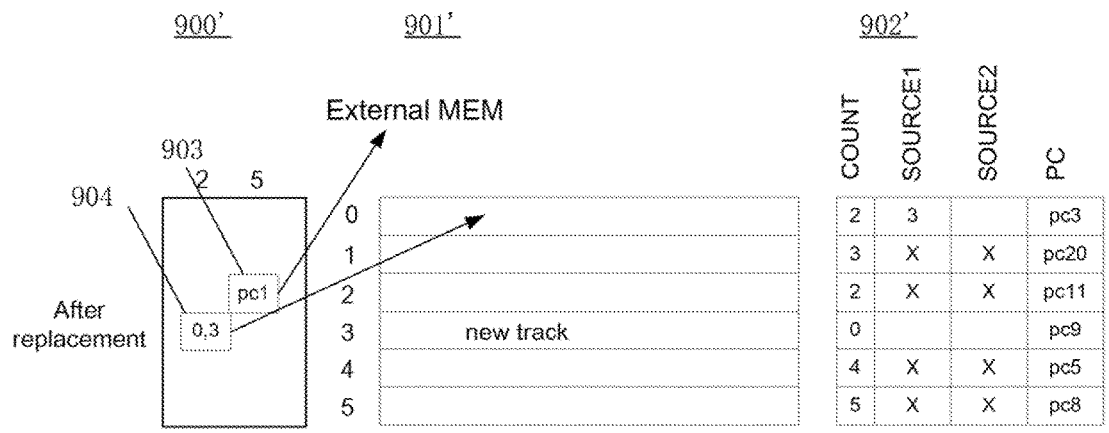
FIG. 10 illustrates a schematic diagram of another exemplary implementation for a storage table replacement method consistent with the disclosed embodiments.

In addition, when a row of new information is stored/recorded in the storage table 901', an index relationship between the new row of information and other row of information is established. FIG. 10 illustrates a schematic diagram of another exemplary implementation for a storage table replacement method consistent with the disclosed embodiments. As shown in FIG. 10, when new information is stored/recorded in the 3rd row in a storage table 901', an index relationship that points to the 0th row information in the stored information is found, and the index relationship is recorded in the index table 900'. Therefore, an index target of an index cell 904 of the 3rd row and the 2nd column in an index table 900' is a storage cell (0, 3) in the 0th row and 3rd column in the storage table 901'.

Therefore, the correlation table 902' needs to be updated accordingly. Because the number of the index rows that use the 0th row in the storage table 901' as an index target is increased, a "COUNT" value in the 0th row in the correlation table 902' is increased by one. That is, the "COUNT" value is equal to '2', and row address '3' in the corresponding index row is stored in "SOURCE1".

In addition, when the index relationship stored in the index table 900' is changed due to any other reasons, the correlation table 902' can be updated by the described above method, which is not repeated herein.

Every row in the correlation table 902 records the number of index rows that use the row as an index target in the index table 900 and addresses of a certain number of index rows in the embodiment in FIG. 9 and FIG. 10. In other embodiments of the disclosure, every row in the correlation table does not record the number of index rows that use the row as an index target in an index table and addresses of a certain number of index rows. However, every row in the correlation table records the number of index cells that use the row as an index target in the index table and cell addresses of a certain number of index cells. The cell address includes a row address and a column address.

Figure 11:
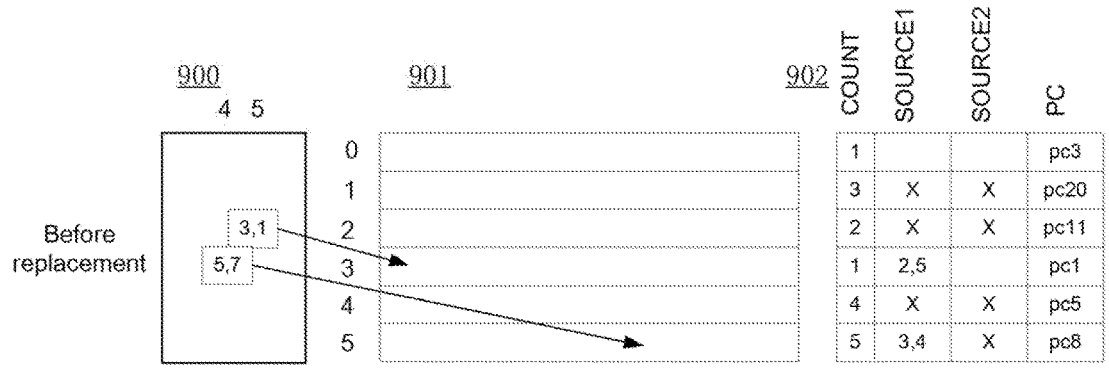
FIG. 11 illustrates a schematic diagram of another exemplary implementation for a storage table replacement method consistent with the disclosed embodiments.

FIG. 11 illustrates a schematic diagram of another exemplary implementation for a storage table replacement method consistent with the disclosed embodiments. As shown in FIG. 11, the storage table and the index table remain unchanged. That is, in the above example for replacing the contents of the 3rd row in the storage table 901, the index cell in the 2nd row and 5th column in the index table still stores the track address (3, 1) and points to the 3rd row in the storage table. Here, the contents recorded in a correlation table 902 needs to be changed. First, because there is only one storage cell that points to the 3rd row in the storage table, "COUNT" stored in the row pointed to by the row address 3 of the correlation table is still 1. However, the "SOURCE1" stored in the row is changed to (2, 5). That is, the "SOURCE1" records the cell address (2, 5) in the index table of the index cell that points to the 3rd row of the storage table.

After these changes, the original process "based on row address 2 stored in "SOURCE1" in the correlation table 902, the 2nd row in the index table 900 is found. Then, a searching operation is performed on the 2nd row in the index table 900 and it is found that the track address stored in the 5th index cell points to the 3rd row in the storage table 901. Further, based on the address tag pc1 stored in the 3rd row in the correlation table 902, a track address (3, 1) stored in the 5th index cell of the 2nd row in the index table is changed to pc1." is also simplified. At this time, based on the cell address (2, 5) in the index table recorded in the correlation table, the stored information is found directly from the index table. That is, the 2nd row and 5th column in the index table is found. The track address (3, 1) stored in the cell in the 2nd row and 5th column in the index table is changed to pc1.

In addition, the replacement of the storage table may refer to the situation that the correlation table stores the row address of the index row. Based on a record in the correlation table, the process that a row in the storage table is selected and replaced includes: a row that records zero index cell is selected and replaced; every row in the correlation table also records an address tag of the corresponding row in the storage table. Based on a record in the correlation table, the process that a row in the storage table is selected and replaced also includes: a row that records more than zero index cell but the cell addresses of all index cells are recorded in the correlation table is selected and replaced; when the replacement is performed, the track address of the index cell recorded in the row to be replaced is replaced with the address tag.

A linked list is also provided based on the above embodiments. If a row address of an index row is stored in the correlation table, when every row in the correlation table is not enough to record all the row addresses of the index rows that use the row as an index target, the linked list is configured to record the row addresses of the index rows as a supplementary to correlation table; similarly, if a cell address of an index cell is stored in the correlation table, when every row in the correlation table is not enough to record all the index addresses of the index cells that use the row as an index target, the linked list is configured to record the cell addresses of the index cells as a supplementary to correlation table.

Figure 12:
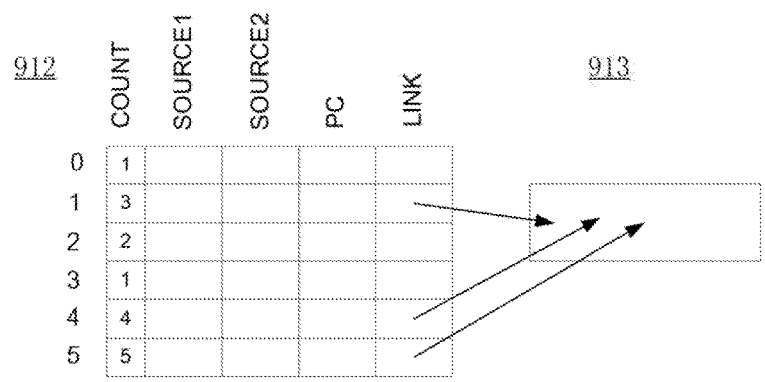
FIG. 12 illustrates a schematic diagram of another exemplary implementation for a storage table replacement method consistent with the disclosed embodiments.

FIG. 12 illustrates a schematic diagram of another exemplary implementation for a storage table replacement method consistent with the disclosed embodiments. As shown in FIG. 12, the schematic diagram only illustrates a correlation table 912 and a linked list 913. The index table and storage table may refer to FIG. 9 or FIG. 11, which are not repeated herein. The linked list 913 is configured to record row addresses of the index rows or cell addresses of the index cells in the correlation table 912 as a supplementary to correlation table. Because the process of recording the row addresses of the index rows is the same as the process of recording the cell addresses of the index cells, only the process of recording the row addresses of the index rows is described in the embodiment shown in FIG. 12.

Referring to FIG. 12, the number of index rows recorded in the rows of correlation table 912 are the followings: "COUNT" of the 0th row is 1; "COUNT" of the 1st row is 3, "COUNT" of the 2nd row is 2, "COUNT" of the 3rd row is 1; "COUNT" of the 4th row is 4; and "COUNT" of the 5th row is 5. That is, the 0th row needs to record 1 row address; the 1st row needs to record 3 row addresses; the 2nd row needs to record 2 row addresses; the 3rd row needs to record 1 row address; the 4th row needs to record 4 row addresses; and the 5th row needs to record 5 row addresses. Every row in the correlation table 912 has two storage cells that are used to store/record the row addresses of the index rows, which are labeled respectively by "SOURCE1" and "SOURCE2" tag (every row only has a certain number of storage cells that are used to record the row address to avoid wasting storage space). The correlation table 912 can also use one column to record a row address of an index row. Or the correlation table 912 can also use three columns and four columns to record the row address of the index row. The linked list 913 as a supplementary to the correlation table can record the row addresses recorded in the 1st row, the 4th row and the 5th row. That is, through the linked list 913, the 1st row can record all 3 row addresses; the 4th row can record all 4 row addresses; and the 5th row can record all 5 row addresses.

After the correlation table 912 which is supplemented by the linked list 913 records all the row addresses of the index rows that use the row as an index target in the index table, every row in the storage table can be replaced, thus reducing the risk of wrong pointing.

The storage table replacement method uses an index table, a storage table containing multiple rows of storage cells, and a correlation table. The storage table stores information in one or more rows of storage cells. The index table stores track addresses of the storage cells in the storage table. Every track address includes a row address and a column address. Every row in the correlation table records a total number of index rows that use the row as an index target in the index table and addresses of a certain number of index rows, where the correlation table and the storage table have a same number of rows. When a row of new information is generated, based on a record in the correlation table, a row in the storage table is selected and replaced.

For example, in a multi-level cache hierarchy, a first level cache (L1 cache, i.e., highest level) is for latency and a last level cache (LLC) is for capacity. Before information blocks are requested, these information blocks are brought from lower level caches and/or memory by using the storage table replacement method. That is, the storage table replacement includes the policies that determine where to store the incoming information block and which information block to evict on a cache miss in the multi-level cache hierarchy. Thus, the storage table replacement can reduce the total cache misses and the time spent on accessing the next level memory. Therefore, a computer system achieves a better performance when the requested information block is cached in the L1 cache.

The disclosed methods may also be used in various processor-related applications, such as general processors, special-purpose processors, system-on-chip (SOC) applications, application specific IC (ASIC) applications, and other computing systems. For example, the disclosed systems and methods may be used in high-performance processors to improve overall system efficiency.

Accordingly, the disclosed system and method may provide a technical solution for cache structures used in digital systems. Different from a conventional cache system that applies a mechanism to fills the cache after cache miss, the disclosed method and system fills the instruction cache before the processor executes an instruction, and may well hide the compulsive miss. Further, the disclosed method and system applies a fully associative structure for level one cache, and set associative structure for level two cache, which may achieve similar effects as fully associative cache, avoid capacity miss, and enhance operation speed of the processor. The disclosed method and system may require relatively less number of matching operations and have low miss rate, thus the power consumption is significantly lower than traditional cache system. For those skilled in the art, other aspects of advantages and applications of the disclosed method system can be obvious.

It is understood by one skilled in the art that many variations of the embodiments described herein are contemplated. While the invention has been described in terms of an exemplary embodiment, it is contemplated that it may be practiced as outlined above with modifications within the spirit and scope of the appended claims.

The apparatuses and methods of this disclosure may be applied to various applications related to cache, and may improve efficiency of the cache.

What is claimed is:

1. A high-performance instruction cache method for facilitating operation of a processor core coupled to a second memory containing executable instructions, and a first memory with a faster speed than the second memory, the method comprising:
examining instructions filled from the second memory to the first memory;
extracting instruction information containing at least branch information;
based on the extracted instruction information, creating a plurality of tracks in a track table, wherein a track in the track table corresponds one-to-one to an instruction block in the first memory, each track table entry of the track corresponds to an instruction in the instruction block in the first memory, and each instruction block in the first memory belongs to an instruction block in the second memory; and
based on one or more tracks from the plurality of tracks, filling one or more instructions that are possibly executed by the processor core from the second memory into the first memory;
wherein:
the second memory is a set associative memory;
according to the information stored in the track table, an instruction to be executed by the processor core is read out from the first memory or from the second memory without reading out a tag from a tag memory and comparing the tag with an address of the instruction to be executed by the processor core;
each instruction block in the first memory corresponds to a first memory address;
each instruction block in the second memory corresponds to a second memory address;
each instruction block in the second memory includes at least one instruction block in the first memory; and
the method further includes:
recording a relationship between the second memory address and the instruction block in an active list.

2. The method according to claim 1, further including:
based on the first memory address, performing an addressing operation for a target address to determine whether the target instruction belongs to an instruction block in the first memory.

3. The method according to claim 1, wherein:
a second memory address is written into the track table by performing a matching operation; and
the second memory address is changed to the first memory address when the instruction from the first memory is filled into the second memory.

4. The methods according to claim 1, further including:
storing the second address of the previous and succeeding second memory blocks into the active list, wherein:
if the branch target instruction locates at the same second memory block with the branch instruction itself but different first memory blocks, and the first memory address in micro active list which corresponds to the first memory block is valid, then the first memory address of branch target instruction is directly derived from the first memory address read out from the micro active list;
if the branch target instruction locates at the same second memory block with the branch instruction itself but different first memory blocks, and the first memory address in micro active list which corresponds to the first memory block is invalid, then the second memory address of branch target instruction is directly derived from the second memory address of this branch instruction; and if the branch target instruction locates at the previous or next second memory block of the branch instruction, and the second memory address in micro active list which corresponds to the previous or next second memory block is valid, then the second memory address of the branch target instruction is direct derived from the second memory address which is read out from the micro active list.

5. The methods according to claim 1, wherein:

multiple second memory addresses and their corresponding content in active list are stored in a micro active list; and the method further includes:
    comparing the branch target address with the content of micro active list once branch instruction is detected, the first or second level block number of branch target instruction is directly derived from the one read out from the micro active list, or otherwise sending branch target address to active list for further match.

6. The method according to claim 1, wherein:

each track has an ending track table entry after the last entry corresponding to the last instruction in the instruction block; and the ending track point stores the first address of the next track (instruction block) to be executed in order.

7. The method according to claim 1, wherein:

after reading out the content of the current track table entry addressed by a read pointer of the tracker, the read pointer is moved to the track table entry succeeding to the current track table entry.

8. The method according to claim 1, wherein:

after reading out the content of the current track table entry addressed by a read pointer of the tracker, the read pointer is moved to the track table entry corresponding to the first branch instruction after the current instruction corresponding to the current track point, based on the instruction type recorded in the track.

9. The method according to claim 8, wherein the read pointer is moved to the table entry corresponds to the first branch instruction further includes:
    reading out the branch instruction types on the entire track; and
    shifting the read out instruction types by the block offset portion of the pointer so the types before the current instruction are discarded.

10. The method according to claim 9, further including:
    detecting the position of the first branch type after shifting; and summing the position with the block offset part of the pointer to obtain the next pointer.

11. The method according to claim 1, wherein, based on the track table, the first memory containing multiple rows instruction blocks, and a correlation table, content of memory is replaced by:
    storing instructions in one or more rows of instruction blocks in the first memory;
    storing, in the track table, track addresses of the instructions in the first memory, wherein every track address includes a row address and a column address;
    recording, in every row in the correlation table, a count of total number of source rows that use the row as an index target in the track table and certain number of source addresses of the said source rows, wherein the correlation table and the first memory have a same number of rows; and
    when a new instruction block is being filling into the first memory, based on a record in the correlation table, selecting and replacing a row in the first memory.

12. The method according to claim 11, wherein selecting and replacing a row in the first memory based on a record in the correlation table includes:
    recording by every row in the correlation table the lower level memory address of the corresponding memory row in the first memory.

13. The method according to claim 12, further including:
    when the memory replacement is performed, selecting the memory row in first memory corresponding to the row of the correlation table as the replacement candidate, wherein the count number recorded in the row of the correlation table equals to the number of valid source row addresses recorded in the same row of the correlation table.

14. The method according to claim 13, further including:
    using the source addresses store in the correlation table row corresponding to the replacement candidate to identify all source track table entries containing the track address indexing the replacement candidate; and
    replacing each the track address in the source track table entries with the lower memory address recorded in the corresponding row of the correlation table.

\* \* \* \* \*